United States Patent
Schleyer

(10) Patent No.: US 8,120,352 B2
(45) Date of Patent: Feb. 21, 2012

(54) DEVICE FOR SELF-ADJUSTING AND METHOD FOR ARRANGING AN IMPULSE TRANSMITTER IN RELATION TO A ROTOR

(75) Inventor: Mathias Schleyer, Kempten (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/998,354

(22) PCT Filed: Oct. 28, 2009

(86) PCT No.: PCT/EP2009/007699
§ 371 (c)(1),
(2), (4) Date: Jul. 14, 2011

(87) PCT Pub. No.: WO2010/049132
PCT Pub. Date: May 6, 2010

(65) Prior Publication Data
US 2011/0260717 A1    Oct. 27, 2011

(30) Foreign Application Priority Data
Oct. 30, 2008 (DE) .......................... 10 2008 054 000

(51) Int. Cl.
*G01B 7/30* (2006.01)
*G01P 3/42* (2006.01)
(52) U.S. Cl. .................... 324/207.25; 324/160; 324/173
(58) Field of Classification Search .................. 324/160, 324/173, 207.25
See application file for complete search history.

(56) References Cited

U.S. PATENT DOCUMENTS

| 4,612,501 A | 9/1986 | Costello et al. |
| 5,922,953 A | 7/1999 | Payne et al. |
| 6,546,824 B2 | 4/2003 | Easton |
| 2003/0096673 A1 | 5/2003 | Ezure et al. |

FOREIGN PATENT DOCUMENTS

| DE | 32 29 207 | 8/2002 |
| DE | 22 43 331 | 10/2007 |
| EP | 1 284 424 | 4/2003 |

OTHER PUBLICATIONS

European Patent Office, International Preliminary Report on Patentability and Written Opinion, May 12, 2011, from International Patent Application No. PCT/EP2009/007699, filed on Oct. 28, 2009.
European Patent Office, Translation of International Preliminary Report on Patentability and Written Opinion, May 12, 2011, from International Patent Application No. PCT/EP2009/007699, filed on Oct. 28, 2009.

*Primary Examiner* — Reena Aurora
(74) *Attorney, Agent, or Firm* — Kenyon & Kenyon LLP

(57) ABSTRACT

An apparatus for self-adjustment of, and a method for disposing, a pulse-type rotation speed transducer in relation to a rotor are described. The pulse-type rotation speed transducer has a cylindrical sensor head and an adapter to a measurement and power supply cable. An elastic clamping sleeve that radially encompasses the cylindrical sensor head is disposed in frictionally engaged fashion in a bore of a holder, the clamping sleeve forming a press fit for the sensor head in the bore. The press fit enables a rotation and an axial displacement between the holder and sensor head. The pulse-type rotation speed transducer has an active, orientation-dependent, cylindrical sensor head, and the clamping sleeve or the pulse-type rotation speed transducer has a twist prevention system in relation to the holder. The twist prevention system enables an axial displacement of the sensor head in the clamping sleeve with respect to the rotor, for self-adjustment, while maintaining the radial alignment or orientation of the sensor head with respect to the rotor.

15 Claims, 24 Drawing Sheets

DEVICE FOR SELF-ADJUSTING AND METHOD FOR ARRANGING AN IMPULSE TRANSMITTER IN RELATION TO A ROTOR

FIELD OF THE INVENTION

The present invention relates to an apparatus for self-adjustment of, and a method for disposing, a pulse-type rotation speed transducer in relation to a rotor. The apparatus has a pulse-type rotation speed transducer having a cylindrical sensor head and an adapter to a measurement and power supply cable. An elastic clamping sleeve that radially encompasses the cylindrical sensor head is disposed in frictionally engaged fashion in a bore of a holder, the clamping sleeve forming a press fit for the sensor head in the bore.

BACKGROUND INFORMATION

An apparatus of this kind having a press fit for a cylindrical sensor head of a pulse-type rotation speed transducer is known for passive pulse-type rotation speed transducers, for example inductive pulse-type rotation speed transducers, in which context the cylindrical sensor head can rotate in the clamping sleeve without considerably influencing or modifying the measurement result.

For active pulse-type rotation speed transducers, however, whose measurement result is orientation-dependent and which operate, for example, with Hall sensors, provision is made for holders with respect to a rotor or magnet wheel which have a screw connection between the holder and sensor head, and which permit neither rotation nor axial displacement of the cylindrical active and orientation-dependent sensor head.

U.S. Pat. No. 5,922,953 discusses an apparatus that operates with an orientation-dependent Hall sensor, the cross section of the sensor head having an axial groove that is in engagement with a spring of a sensor housing surrounding the sensor head and forms a twist prevention system by way of a modification of the cylindrical shape of the sensor head. The sensor housing surrounding the sensor head is moreover connected to a laterally projecting arm that is bolted onto the holder and thus ensures radial immobilization of the sensor housing.

An apparatus of this kind for self-adjustment of a pulse-type rotation speed transducer disadvantageously requires, in addition to the modified active sensor head having an axially aligned groove-spring construction in order to produce a twist prevention system, a further complex and cost-intensive sensor housing in which the sensor head can be axially displaced without changing the radial alignment.

U.S. Pat. No. 4,612,501 discusses an apparatus for self-adjustment of a pulse-type rotation speed transducer in which what is used as a twist prevention system is a clamping ring that, by way of corresponding cutouts that are to be recessed into the cylindrical sensor head, positively ensures rotation between the clamping ring and sensor head. This apparatus has the disadvantage, however, that the clamping ring, with its clamping teeth, can rotate in the smooth bore wall of the holder, and the sensor can thus also rotate in the bore. Reliable radial alignment of an orientation-dependent sensor is thus not obtained, since twist prevention between the holder and clamping ring is not provided here. This apparatus, too, has the disadvantage that the profile of the cylindrical sensor head must be modified in order to ensure at least rotation of the sensor head with respect to the clamping ring.

SUMMARY OF THE INVENTION

An object of the exemplary embodiments and/or exemplary methods of the present invention is to create an apparatus for self-adjustment of a pulse-type rotation speed transducer in relation to a rotor, and a method for disposing a pulse-type rotation speed transducer on a rotor, that is economical to manufacture and that economically maintains the cylindrical shape of the sensor head. A further object is to describe an apparatus that does not require a complex housing, known from the existing art, for the cylindrical sensor head in order to mechanically connect the sensor head to a holder in oriented but nevertheless axially displaceable fashion.

This object may be achieved with the subject matter described herein. Advantageous refinements of the exemplary embodiments and/or exemplary methods of the present invention are also described herein.

According to the exemplary embodiments and/or exemplary methods of the present invention, an apparatus for self-adjustment of a pulse-type rotation speed transducer in relation to a rotor, and a method for disposing a pulse-type rotation speed transducer on a rotor, are created. In this context, the apparatus has a pulse-type rotation speed transducer having a cylindrical sensor head and having an adapter to a measurement and power supply cable. An elastic clamping sleeve that radially encompasses the cylindrical sensor head is disposed in frictionally engaged fashion in a bore of a holder, the clamping sleeve forming a press fit for the sensor head in the bore. The press fit enables rotation and axial displacement between the holder and sensor head.

The pulse-type rotation speed transducer has an active, orientation-dependent, cylindrical sensor head, and the clamping sleeve or the pulse-type revolution counter has a twist prevention system in relation to the holder. The twist prevention system enables axial displacement of the sensor head in the clamping sleeve with respect to the rotor, for self-adjustment of the sensor head while maintaining the radial alignment or orientation of the sensor head with respect to the rotor.

This apparatus has the advantage that in contrast to the existing art, no change in the cylindrical shape of the active orientation-dependent sensor head is necessary. The present invention furthermore has the advantage that only the adapter (made of plastic) and/or the clamping sleeve need to be modified in order to enable effective, economical twist prevention while simultaneously maintaining an axial displacement of the sensor in the clamping sleeve with respect to the rotor, so that self-adjustment of the sensor head with respect to the rotor becomes possible with this apparatus.

In a first embodiment of the present invention, the clamping sleeve has two tabs as a twist prevention system, a first tab being in engagement with the adapter of the pulse-type rotation speed transducer, and a second tab with the holder. Because clamping sleeves of this kind can be stamped out of a resilient metal sheet, no additional cost-intensive outlay is involved in stamping out, in the context of this stamping operation, two additional tabs at the edges of the unrolled clamping sleeve and, upon assembly of the holder and pulse-type rotation speed transducer, bringing a first tab into engagement with the adapter of the pulse-type rotation speed transducer and immobilizing a second tab on the holder. All that need be ensured in this context is that a cutout in the adapter enables an axial displacement of the adapter with respect to the first tab.

A variety of dispositions of the first and the second tab are possible in order to form a twist prevention system with the aid of the clamping sleeve. In a further embodiment of the present invention, the first and the second tab of the clamping sleeve are disposed on a single edge of the clamping sleeve. In a further embodiment of the present invention, provision is made to dispose the first and the second tab of the clamping sleeve on edges of the clamping sleeve that are located opposite one another. Lastly, it is also possible to dispose the first and the second tab of the clamping sleeve on edges of the clamping sleeve that are at an angle to one another. These three modifications have different advantages that will be further explained individually with reference to the Figures below.

The second tab of the clamping sleeve may be immobilized in a matching cutout of the holder. The first tab of the clamping sleeve projects into a matching cutout of the adapter. Twist prevention of the clamping sleeve with respect to the holder is thus advantageously ensured by the immobilization of the second tab, while the first tab on the one hand represents a twist prevention system with respect to the adapter and thus the pulse-type rotation speed transducer, and on the other hand, because of the depth of the cutout in the adapter for the first tab, axial displaceability of the adapter is possible with respect to the clamping sleeve, and thus also with respect to the holder and lastly also the rotor.

In a further embodiment of the present invention, the clamping sleeve has almost smooth edges without additional tabs. Only known axial securing tabs prevent the clamping sleeve from axially sliding through upon introduction of the cylindrical sensor head. The adapter has at least one orientation pin that can be brought into engagement with an orientation bore of the holder in order to radially immobilize the pulse-type rotation speed transducer in an orientation direction. Because an adapter of this kind is manufactured from a plastic compound using the injection molding method, there is no substantial additional cost outlay if an orientation pin is also simultaneously molded on in the context of this injection molding step; said pin has the same alignment as the sensor head and can thus, upon introduction of the sensor head into the clamping sleeve and into the bore of the holder, the orientation pin can also be inserted into a previously produced orientation bore of the holder.

If the area moment of inertia of the cross section of this plastic orientation pin is not sufficient to compensate for the torque occurring between the pulse-type rotation speed transducer and the holder, it is then also possible, in a further embodiment of the present invention, to bring multiple orientation pins into engagement with multiple orientation bores. In addition, the cross-sectional area and cross-sectional shape of the orientation pin can be designed for a greater area moment of inertia in order to compensate for the torque between the holder and adapter.

In a further embodiment of the present invention, the clamping sleeve has almost smooth edges without additional tabs. Only known axial securing tabs prevent the clamping sleeve from axially sliding through upon introduction of the cylindrical sensor head. In this further embodiment of the present invention, the adapter has at least one orientation bore that can be brought into engagement with an orientation pin of the holder in order to radially immobilize the pulse-type rotation speed transducer in an orientation direction. With this solution, a metal orientation pin can be aligned parallel to the bore for the cylindrical sensor head. This orientation pin can be fitted, as a fitting pin, into a bore of the holder, or can be screwed into a prepared threaded bore of the holder.

A metal orientation pin has the advantage that it can absorb considerably greater shear stresses as compared with a plastic orientation pin, so that a metal orientation pin that is immobilized in the holder can transfer, with greater reliability, torques occurring between the holder and adapter.

Methods for disposing a pulse-type rotation speed transducer on a rotor have different method steps because of the different twist prevention systems—on the one hand by way of a specific conformation of the clamping sleeve or on the other hand via a direct coupling using a coupling element, such as an orientation pin, between the adapter of the pulse-type rotation speed transducer and the holder.

The method steps that result in cases with a modified clamping sleeve are as follows: Firstly a pulse-type rotation speed transducer, having an active, orientation-dependent, cylindrical sensor head and having an adapter to a measurement and power supply cable, is manufactured. Further, a clamping sleeve is introduced into a bore of a holder, accompanied by attachment of a first twist prevention system for the clamping sleeve with respect to the holder. The cylindrical sensor head can then be introduced into the clamping sleeve, accompanied by introduction of a second twist prevention system for the clamping sleeve with respect to the pulse-type rotation speed transducer, while maintaining an axially movable press fit of the cylindrical sensor head in the clamping sleeve in the direction toward the rotor.

An axial displacement of the sensor head in the clamping sleeve is then performed until the sensor head touches the stationary rotor. This is then followed by self-adjustment of the sensor head to a minimum measuring distance from the rotor, by rotation of the rotor accompanied by axial adapting displacement of the press fit of the sensor head in the clamping sleeve.

An advantage of this method is that the considerable tolerance differences especially in commercial vehicle construction are compensated for by the self-adjustment. In addition, the self-adjustment that is economically achievable with the apparatus according to the present invention ensures that a minimum measurement distance between the poles of the magnet wheel or rotor and the sensor head is established automatically as soon as the rotor is rotating. A further advantage with this method is that no additional process steps become necessary, so that the unrolled clamping sleeve can, as before, still be stamped out of a resilient steel sheet.

In addition, as before, the adapter can be shaped onto the active, orientation-dependent and cylindrical sensor head using a single injection molding step. All that is necessary is to provide in the adapter an axial cutout, disposed parallel to the cylinder head, that is brought into engagement with a first tab of the clamping sleeve upon assembly of the apparatus. Twist prevention of the clamping sleeve with respect to the holder can also be implemented by introducing a correspondingly adapted cutout into the holder, the second tab of the clamping sleeve lastly being immobilized in positive fashion in said cutout.

In the case in which an uncoiled or unrolled clamping sleeve having almost smooth edges, without additional tabs, is used, the following method steps result for a method for disposing a pulse-type rotation speed transducer on a rotor: Firstly, once again a pulse-type rotation speed transducer, having an active, orientation-dependent, cylindrical sensor head and having an adapter to a measurement and power supply cable, is manufactured. A twist prevention system is, however, shaped onto or into the adapter in this context. Introduction of the clamping sleeve into a bore of a holder, for a rotatable and axially displaceable press fit between the bore and the sensor head, can then be accomplished.

Once the clamping sleeve is positioned in the bore, the cylindrical sensor head can be introduced into the clamping sleeve, accompanied by coupling of the twist prevention system with a coupling element of the holder, while maintaining an axially movable press fit of the cylindrical sensor head in the clamping sleeve in the direction toward the rotor. The sensor head is then displaced axially in the clamping sleeve until it touches the stationary rotor. Self-adjustment of the sensor head to a minimum measuring distance from the rotor is then performed, by rotation of the rotor accompanied by axial adapting displacement of the press fit of the sensor head in the clamping sleeve.

As a twist prevention system, an orientation pin can be attached, either onto the adapter or onto the holder, parallel to the axis of the bore in the holder. An orientation bore is correspondingly introduced into the holder or the adapter, respectively. This method step introduces either the adapter or the holder along with a corresponding orientation pin that matches a corresponding orientation bore of the other partner.

The exemplary embodiments and/or exemplary methods of the present invention will now be explained in further detail with reference to the appended Figures.

DETAILED DESCRIPTION

Figure 1:
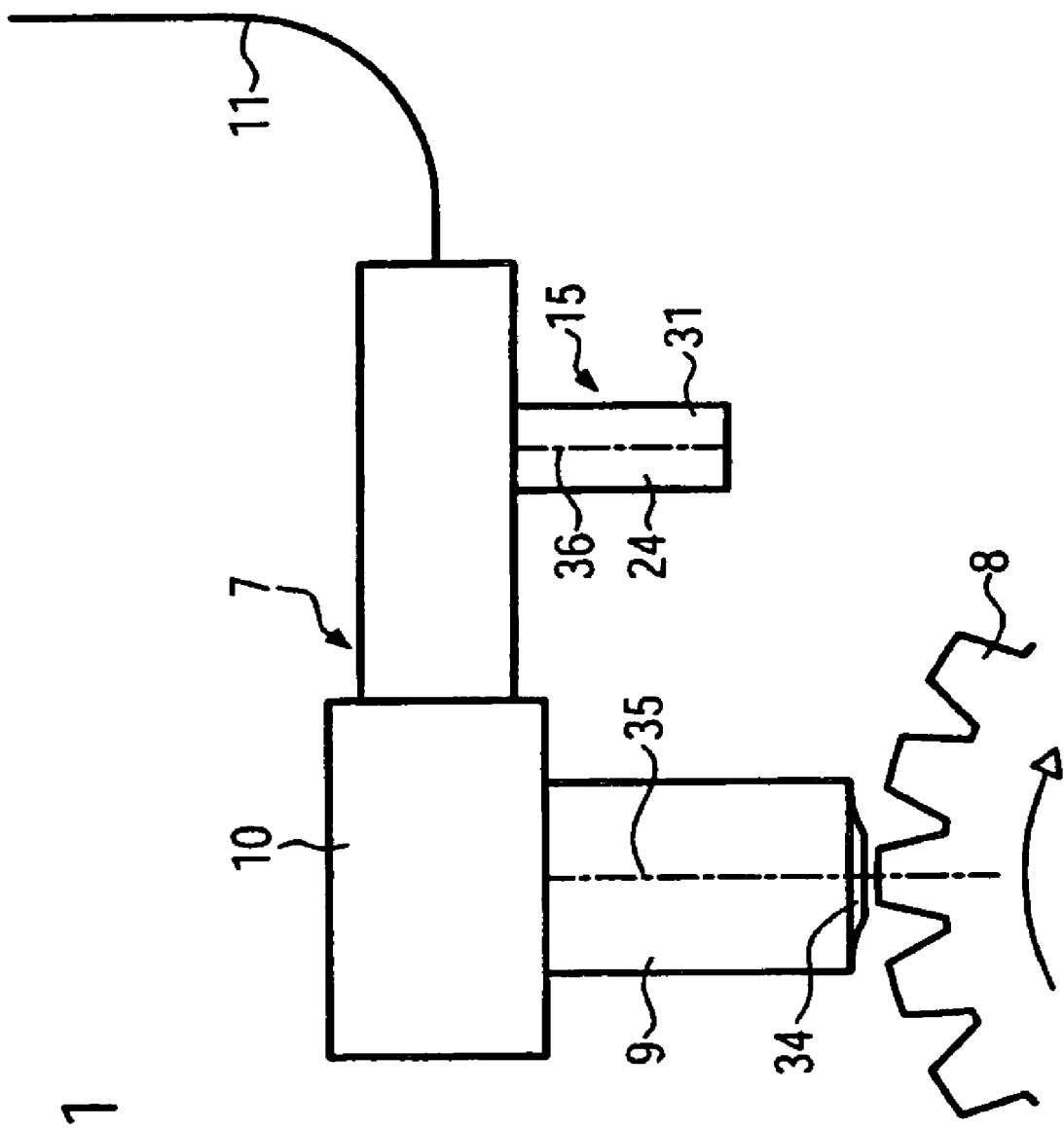
FIG. 1 is a schematic view of an active pulse-type rotation speed transducer having a coupling element for a twist prevention system.

FIG. 1 is a schematic view of an active pulse-type rotation speed transducer 7 having a coupling element 31 for a twist prevention system 15. This pulse-type rotation speed transducer 7 has an active, orientation-dependent, cylindrical sensor head 9 and an adapter 10 to a measurement and power supply cable 11. This measurement and power supply cable 11 furnishes a supply voltage for a Hall sensor circuit board in measurement tip 34 of sensor 9, and further measurement cables for conveying the measurement signals of the Hall sensor circuit board.

Sensor tip 34 of a sensor head 9 of this kind furnishes maximal sensor signals when sensor tip 34 is aligned and immobilized in correctly oriented fashion, i.e. radially to axis 35 of sensor head 9, with respect to a magnet wheel embodied as rotor 8. Shaped onto adapter 10 for this alignment and immobilizing purpose is coupling element 31, which in this embodiment of the present invention is shaped as an orientation pin 24 onto adapter 10 when the latter is injection-molded, axis 36 of the orientation pin being aligned parallel to axis 35 of sensor head 9.

Figure 2:
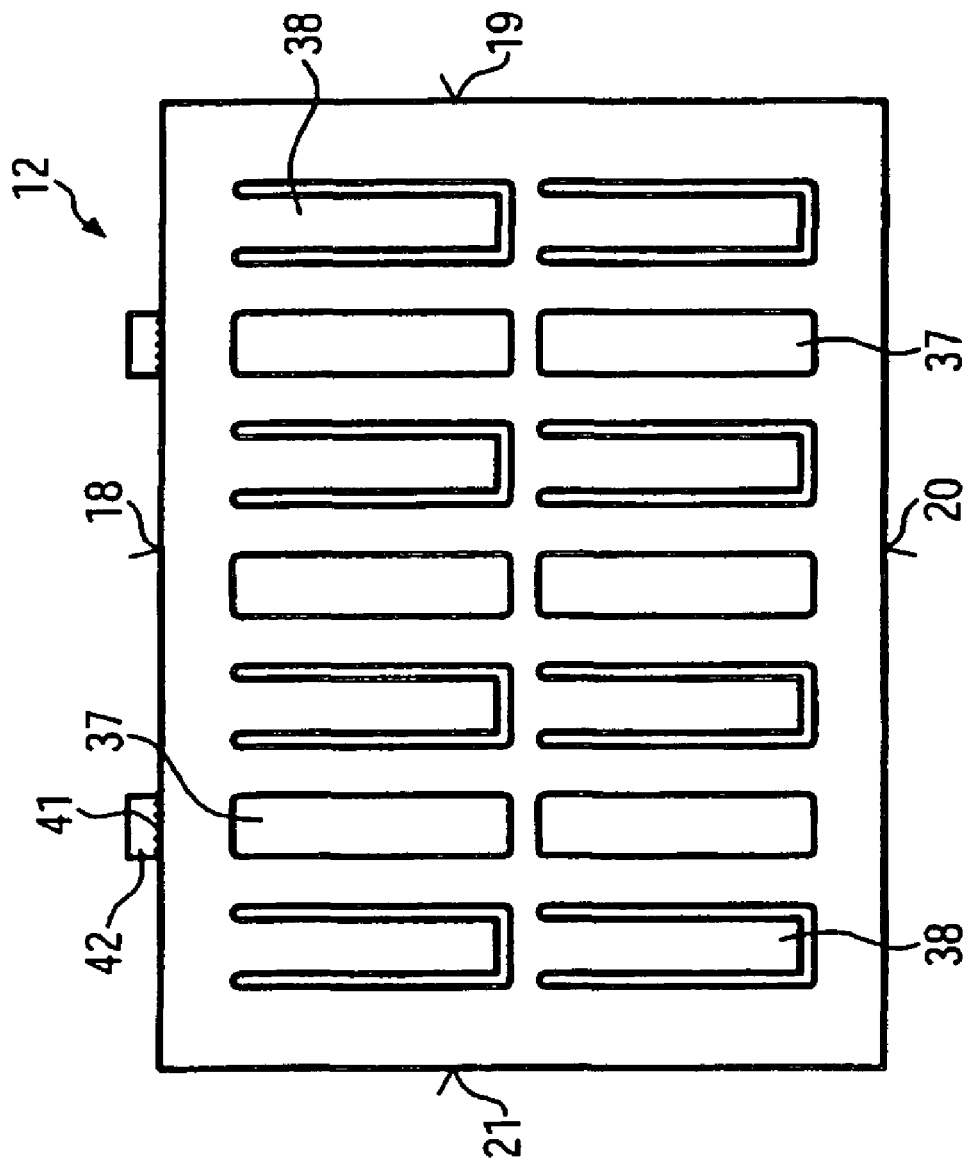
FIG. 2 is a schematic plan view of an unrolled clamping sleeve.

FIG. 2 is a schematic plan view of an unrolled clamping sleeve 12 for immobilizing the pulse-type rotation speed transducer shown in FIG. 1 in a bore of a holder. In this embodiment of the present invention, the unrolled clamping sleeve 12, which can be stamped out of a resilient sheet-metal panel, has panel edges 18, 19, 20, and 21. Upon stamping, cutouts are at the same time taken into consideration in order to vary the contact pressure of clamping sleeve 12 against a bore in a holder. Also stamped out in the stamping operation are elastically resilient clamping tabs 38 that ensure a press fit for a cylindrical element to be introduced into the bore.

In addition, two axial securing tabs 42 and 43 are pre-shaped on edge 18; before clamping sleeve 12 is inserted into the bore of a holder for the sensor head, these tabs are bent over along dotted line 41 in such a way that upon insertion of the sensor head into the bore of the holder, clamping sleeve 12 does not slip because the folded-over axial securing tabs 42 and 43 are braced against the holder.

Figure 3:
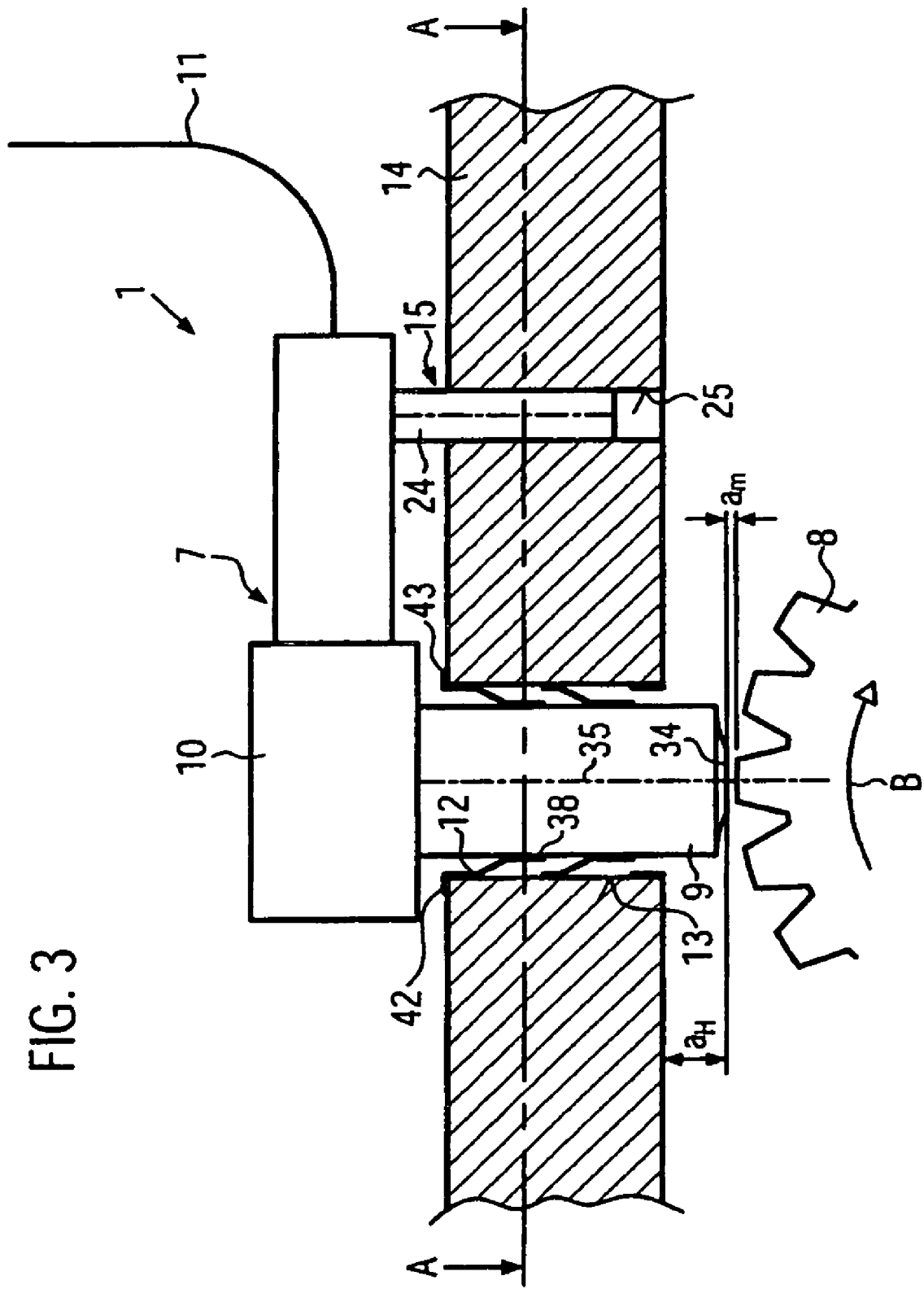
FIG. 3 is a schematic cross section through an apparatus according to a first embodiment of the present invention.

FIG. 3 is a schematic cross section through an apparatus 1 according to a first embodiment of the present invention. This apparatus 1 has a holder 14 and a magnet wheel as rotor 8, rotor 8 and holder 14 being disposed at a distance $a_H$ from one another. The resilient clamping sleeve 12 shown in FIG. 2 is introduced into a bore 13 of holder 14 and is braced with respect to the wall of bore 13, and with the aid of clamping tabs 38 shown in FIG. 2 forms a press fit for sensor head 9 inserted into the clamping sleeve.

An elastic clamping sleeve 12 of this kind that forms a press fit for sensor head 9 allows sensor head 9 to be displaced axially and to rotate radially. In order to ensure orientation and radial alignment of the active, orientation-dependent, cylindrical sensor head 9, and nevertheless to permit an axial displacement of sensor 9 in the press fit with respect to holder 14, in this embodiment of the present invention an orientation pin 24 constituting a twist prevention system 15 is shaped onto adapter 10, said pin being introduced, when sensor head 9 is slid into bore 13, into a corresponding orientation bore 25, aligned parallel to bore 13, of holder 14.

It is thereby possible, with rotor 8 at a standstill, to place measurement tip 34 onto rotor 8 and, upon rotation of rotor 8 in arrow direction B, to ensure self-adjustment of sensor tip 34 and of pulse-type rotation speed transducer 7. Because, for this embodiment of the present invention, only one cylindrical sleeve needs to be made available for pulse-type rotation speed transducer 7, a complex housing for ensuring an axial displacement of sensor head 9 in holder 14 can be omitted, thereby making possible a considerable saving of space and cost. This sensor head 9 consequently requires minimal space and can be inserted into a correspondingly adapted bore 13 having a minimal diameter, in which context an orientation bore 25 guides orientation pin 24 as a twist prevention 15.

Figure 4:
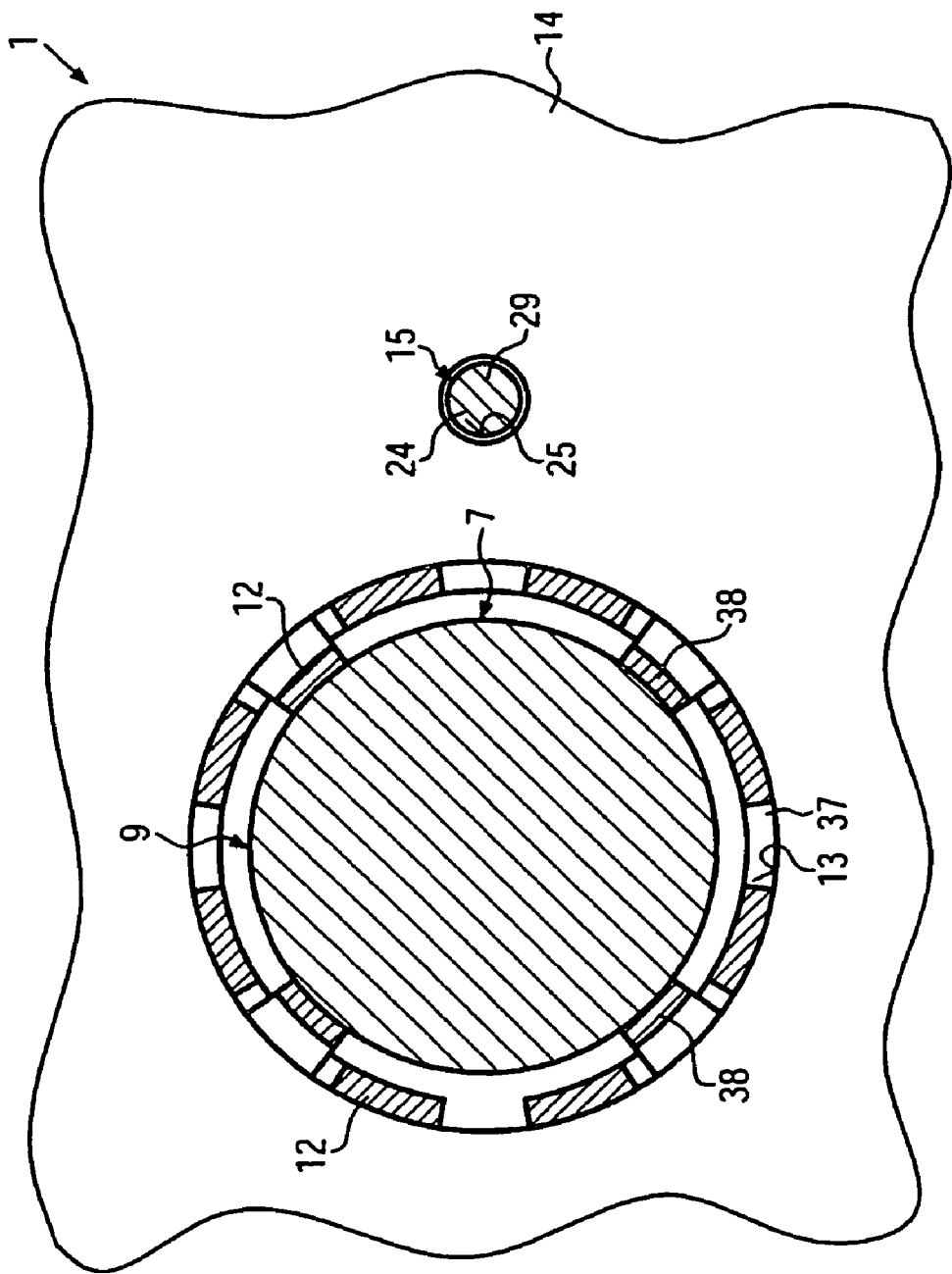
FIG. 4 is a schematic cross section through the apparatus according to FIG. 3, along section line A-A.

FIG. 4 is a schematic cross section through apparatus 1 according to FIG. 3, along section line A-A. It is clear from this sectioned drawing that only two bores 13 and 25 need to be introduced into holder 14 in order on the one hand to align sensor head 9 and, with the aid of orientation pin 24, to prevent it from twisting. The cylindrical sensor head 9 can, in this context, be maintained unchanged, and requires neither a groove nor additional cutouts into which, in the existing art, positive elements of the holder or a clamping ring engage; instead, clamping tabs 38 form a press fit for sensor head 9.

Torques that act on pulse-type rotation speed transducer 7 in relation to holder 14 are compensated for by orientation pin 24; cross-sectional area 29 of the orientation pin must exhibit a sufficiently high area moment of inertia to withstand such torques and also, on the other hand, to compensate for shear stresses that occur. If a single orientation pin 24 is not sufficient, orientation pins having an enlarged cross section and a modified contour, or even a plurality of orientation pins, can then be shaped onto adapter 10.

Figure 5:
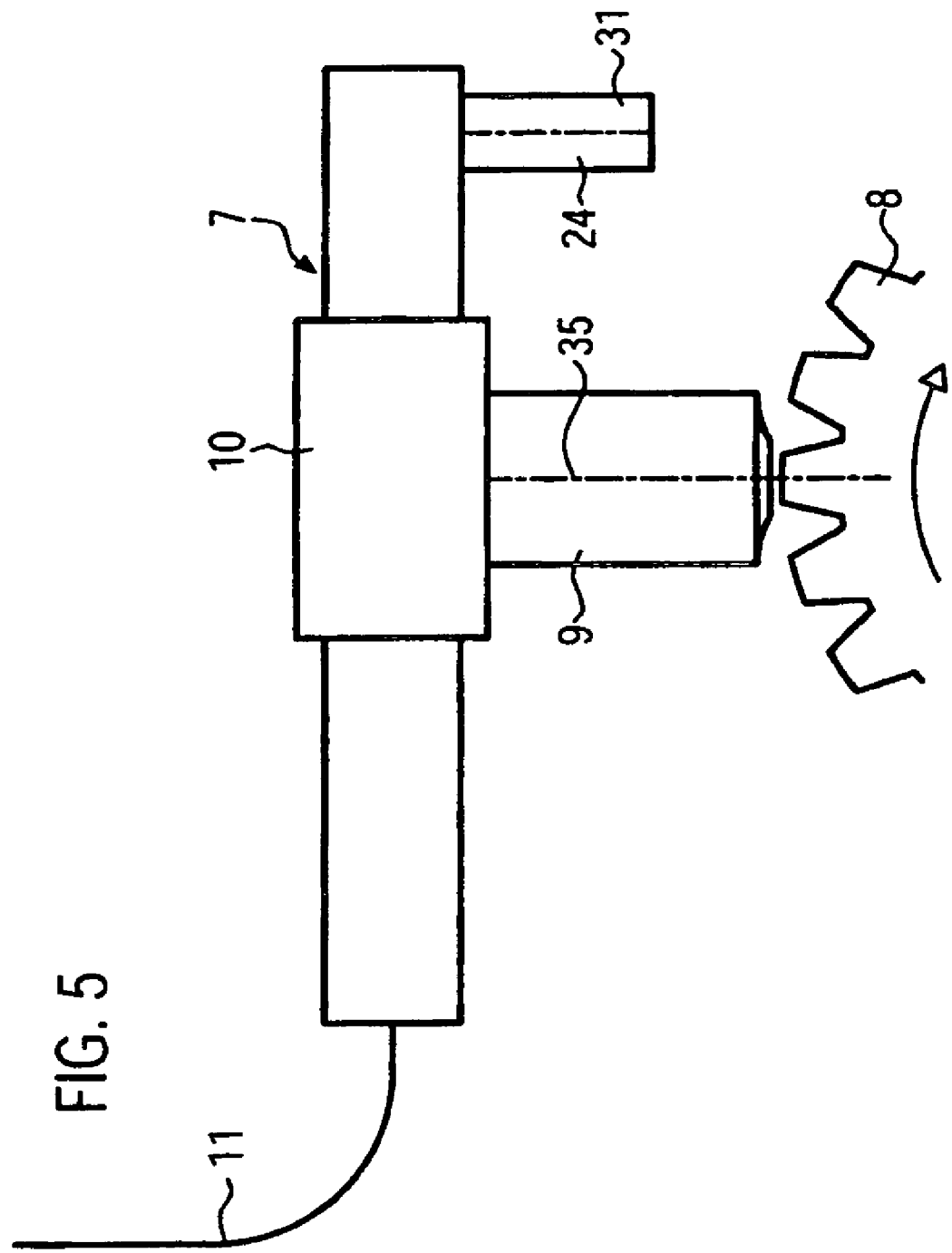
FIG. 5 is a schematic view of an active pulse-type rotation speed transducer having a modified coupling element for a twist prevention system.

FIG. 5 is a schematic view of an active pulse-type rotation speed transducer 7 having a modified coupling element 31 for a twist prevention. Components having the same functions as in the preceding Figures are labeled with the same reference characters and are not additionally discussed. Coupling element 31 is modified in that an extension 44 that has the orientation pin 24, which is disposed parallel to a bore in the holder and projects not out of the transition from the adapter to the measurement and power supply cable 11 but out of extension 44, is shaped onto the adapter.

Figure 6:
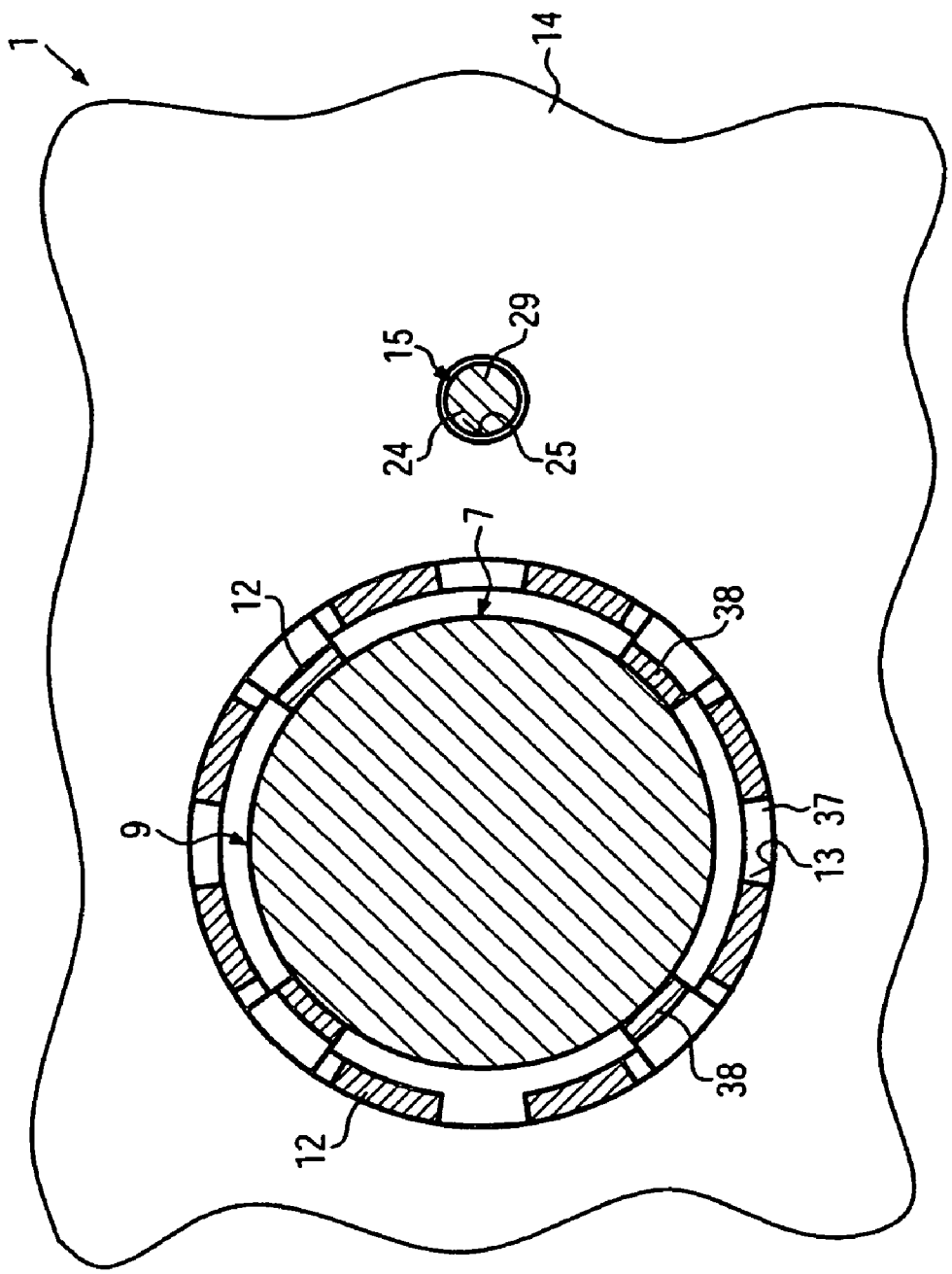
FIG. 6 is a schematic cross section through an apparatus having a modified coupling element.

FIG. 6 is a schematic cross section through an apparatus having a modified coupling element 31. This cross section shows that only two bores 13 and 25 need to be introduced into holder 14 in order on the one hand to align sensor head 9 radially and, with the aid of orientation pin 24, prevent it from twisting. The cylindrical sensor head 9 can, in this context, remain unchanged, and requires neither a groove nor additional cutouts into which, in the existing art, positive elements of the holder or a clamping ring engage; instead, clamping tabs 38 form a press fit for sensor head 9.

Figure 7:
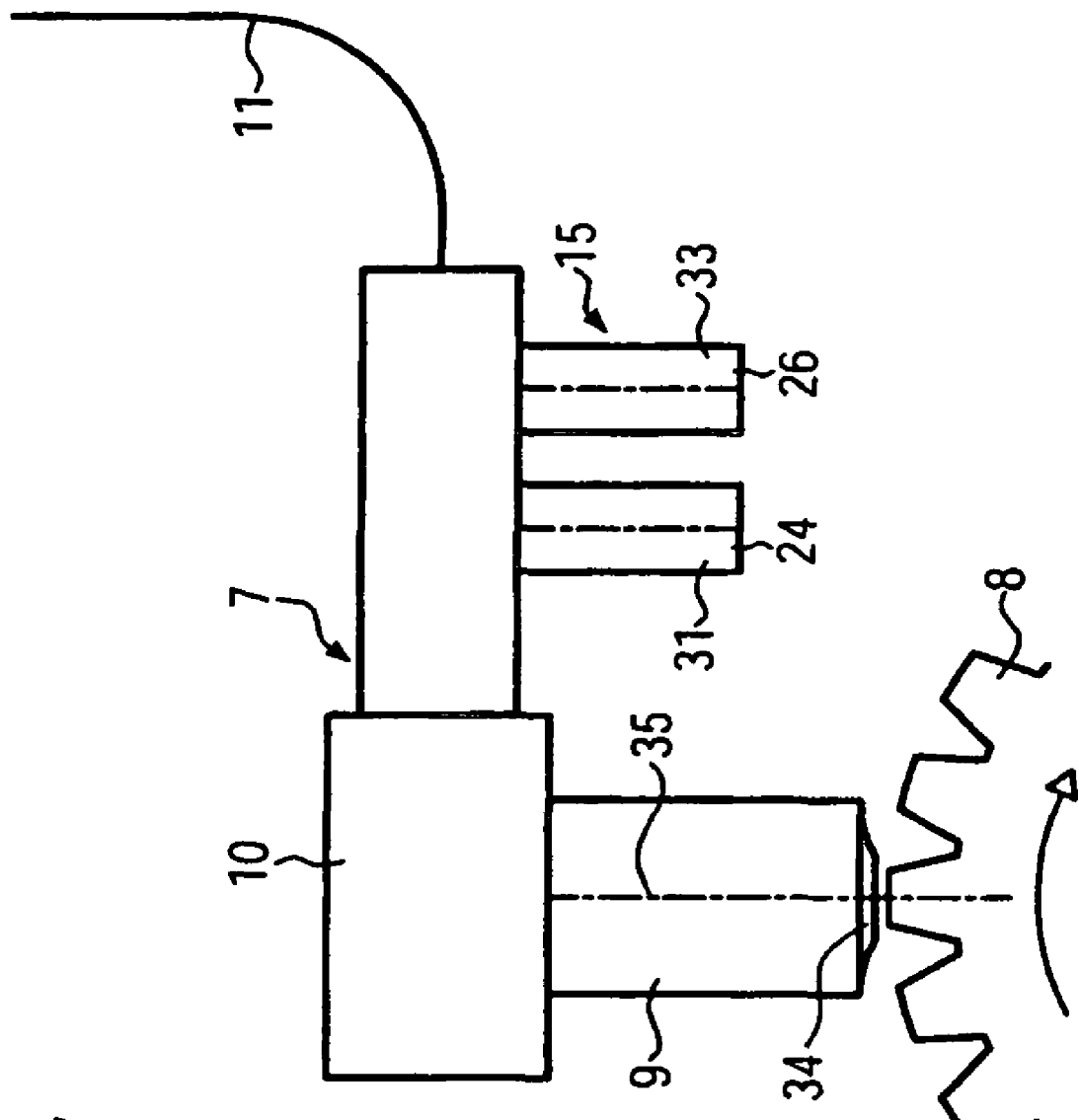
FIG. 7 is a schematic view of a further active pulse-type rotation speed transducer having multiple coupling elements.

FIG. 7 is a schematic view of a further active pulse-type rotation speed transducer 7 having multiple coupling elements 31 and 33 for a twist prevention system 15. An elevated torque acting on sensor head 9 can be compensated for by way of the distance of orientation pin 26 that is disposed parallel to axis 35 of sensor head 9. A further result of this second orientation pin 26 is also that the entire cross section, and thus the area moment of inertia, of twist prevention system 15 is considerably increased.

Figure 8:
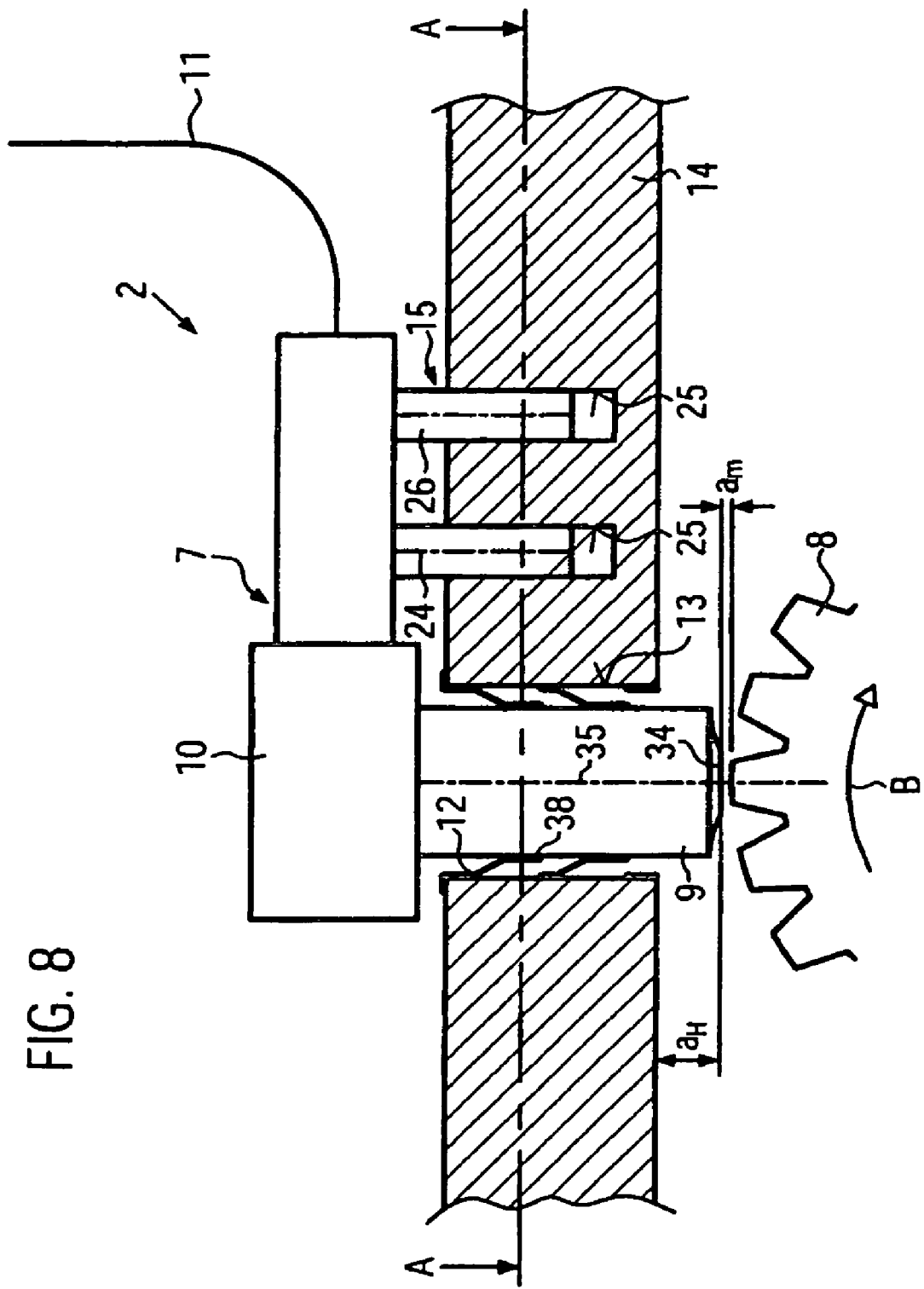
FIG. 8 is a schematic cross section of an apparatus according to a second embodiment of the present invention.

FIG. 8 is a schematic cross section through an apparatus 2 according to a second embodiment of the present invention. Components having the same functions as in the preceding Figures are labeled with the same reference characters and are not additionally discussed. Second orientation pin 26 shown here requires a second orientation bore 27 in holder 14, which is introduced axially parallel to bore 13 so that an axial displacement of sensor head 9 is possible while simultaneously maintaining the radial alignment (and thus the orientation) of sensor head 9. Instead of the through bores for orientation bores 25 and 27 shown in the first embodiment of the present invention, in this embodiment blind bores are provided as orientation bores 25 and 27.

Figure 9:
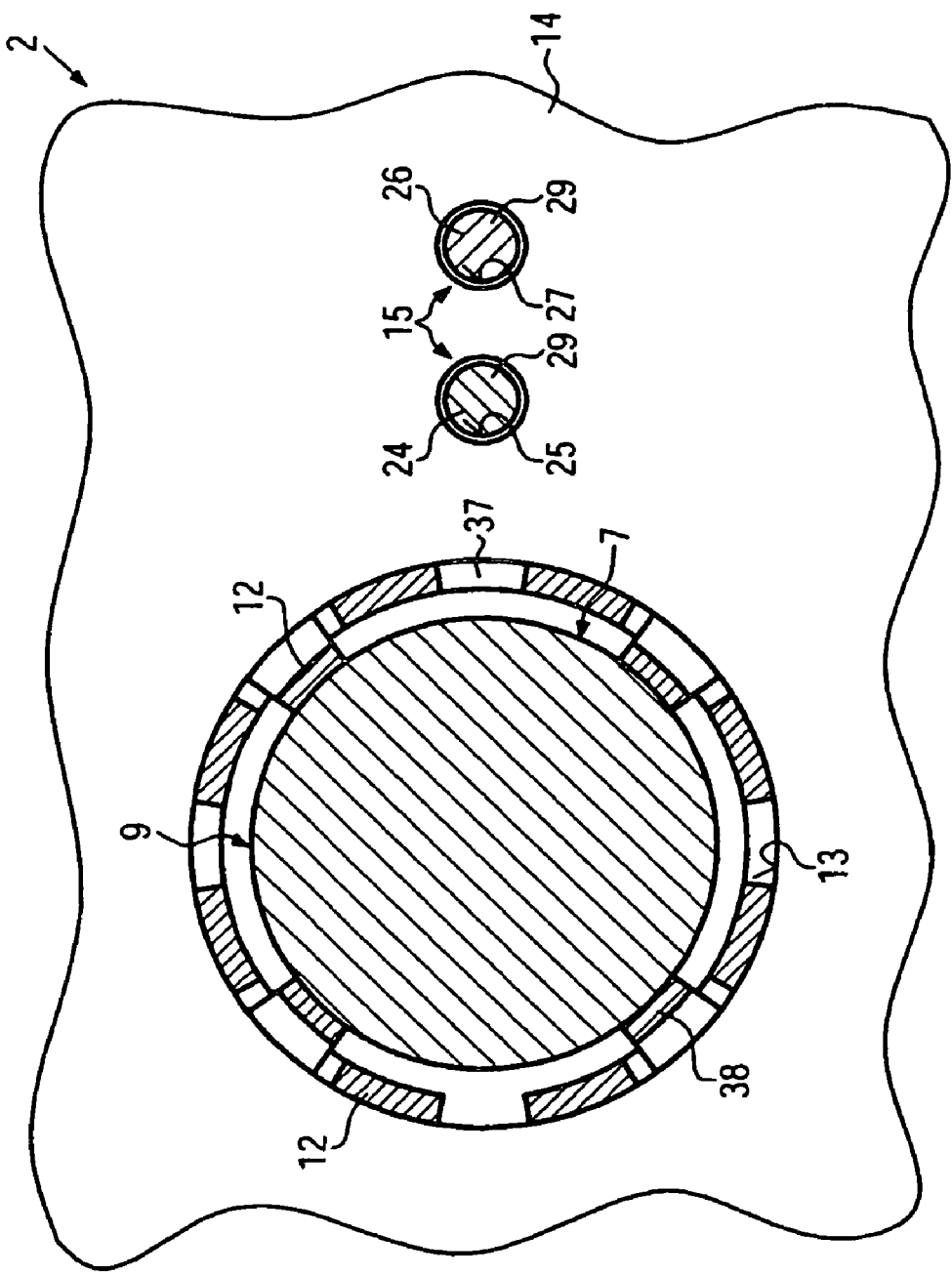
FIG. 9 is a schematic cross section through the apparatus according to FIG. 8, along section line A-A.

FIG. 9 is a schematic cross section through apparatus 2 according to FIG. 8, along section line A-A; in addition to orientation bore 25 shown in FIG. 4, a further orientation bore introduced at a greater distance from sensor head 9 is now recessed into holder 14, in which a second orientation pin 26 can be introduced as a twist prevention system 15 upon insertion of sensor head 9 into clamping sleeve 12. Both orientation pins 24 and 26 are injection-molded onto adapter 10 made of plastic, so that their resistance to shear stresses is limited. In order further to increase the resistance with respect to shear stresses, in a further embodiment of the present invention it is possible to provide an orientation pin made of metal.

Figure 10:
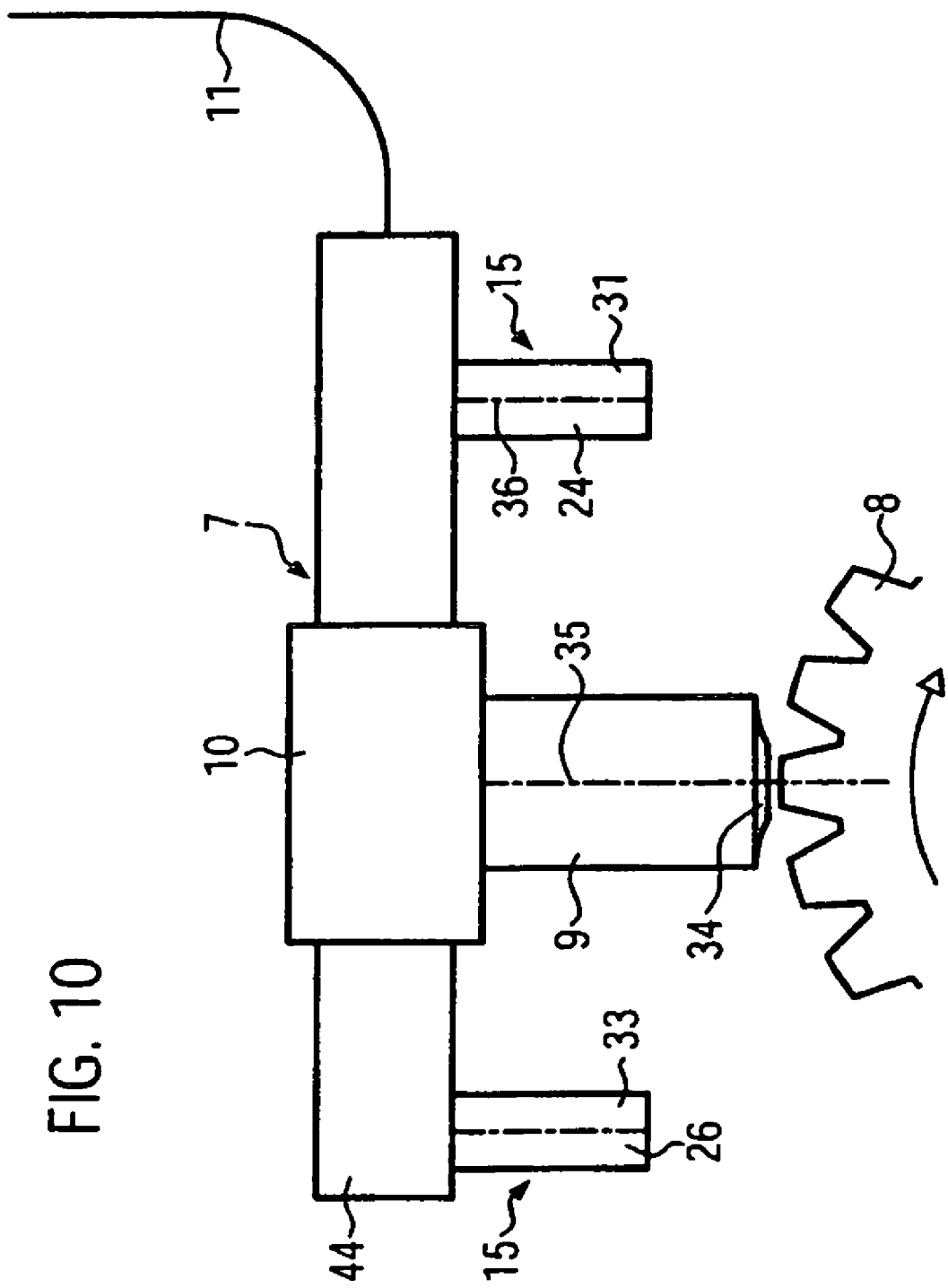
FIG. 10 is a schematic view of a further active pulse-type rotation speed transducer having a modified disposition of the coupling elements.

FIG. 10 is a schematic view of a further active pulse-type rotation speed transducer having a modified disposition of the coupling elements. Here second coupling element 33 is disposed, as orientation pin 24, on an extension 44 of adapter 10. Extension 44 and the second orientation pin are disposed on the adapter oppositely to the transition to measurement and power supply cable 11.

Figure 11:
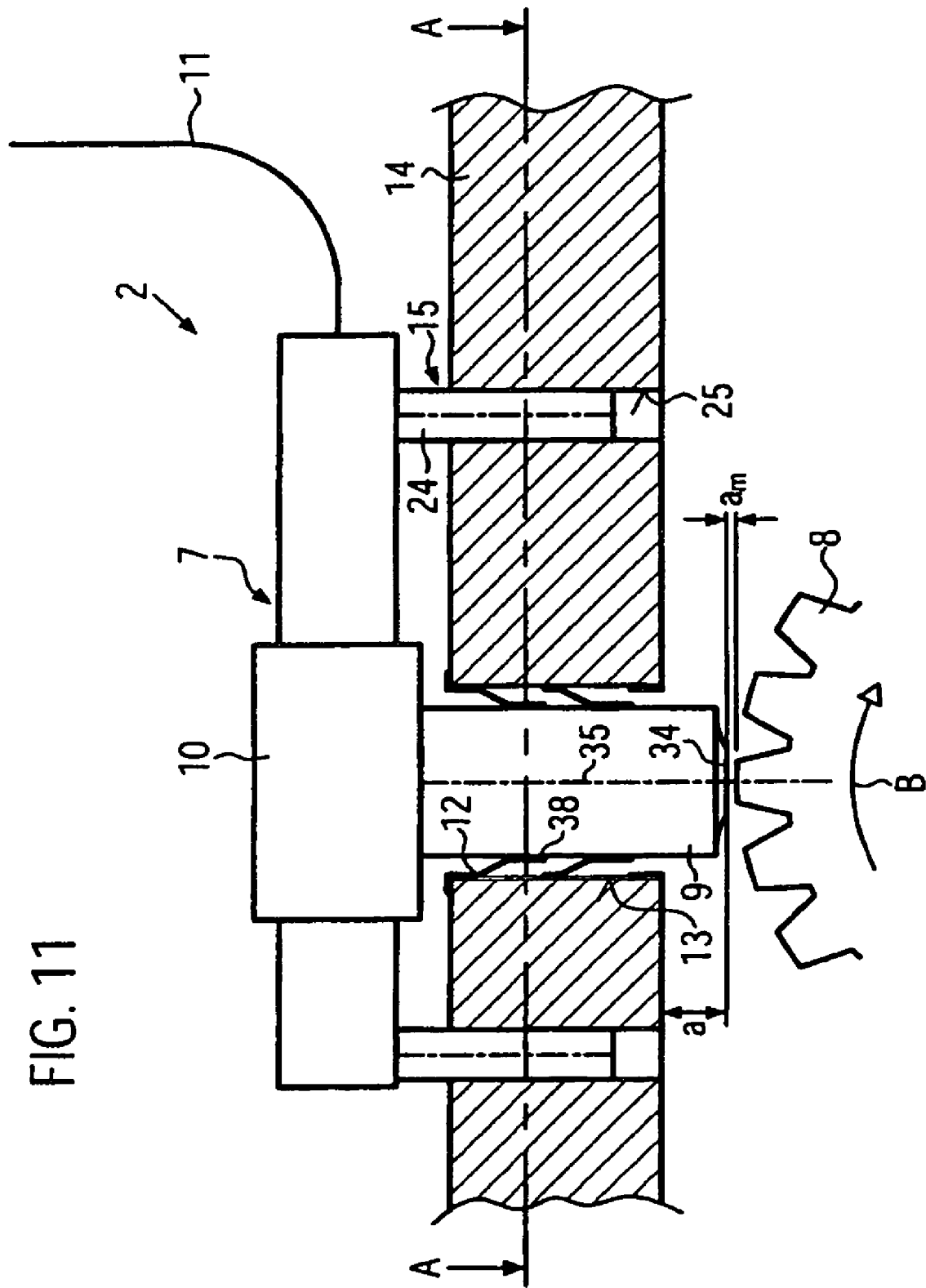
FIG. 11 is a schematic cross section of an apparatus according to a modified second embodiment of the present invention.

FIG. 11 is a schematic cross section of an apparatus according to a modified second embodiment of the present invention; for that purpose, the disposition of the orientation bores in the holder is now also modified in accordance with the modified disposition of the coupling elements or orientation pins.

Figure 12:
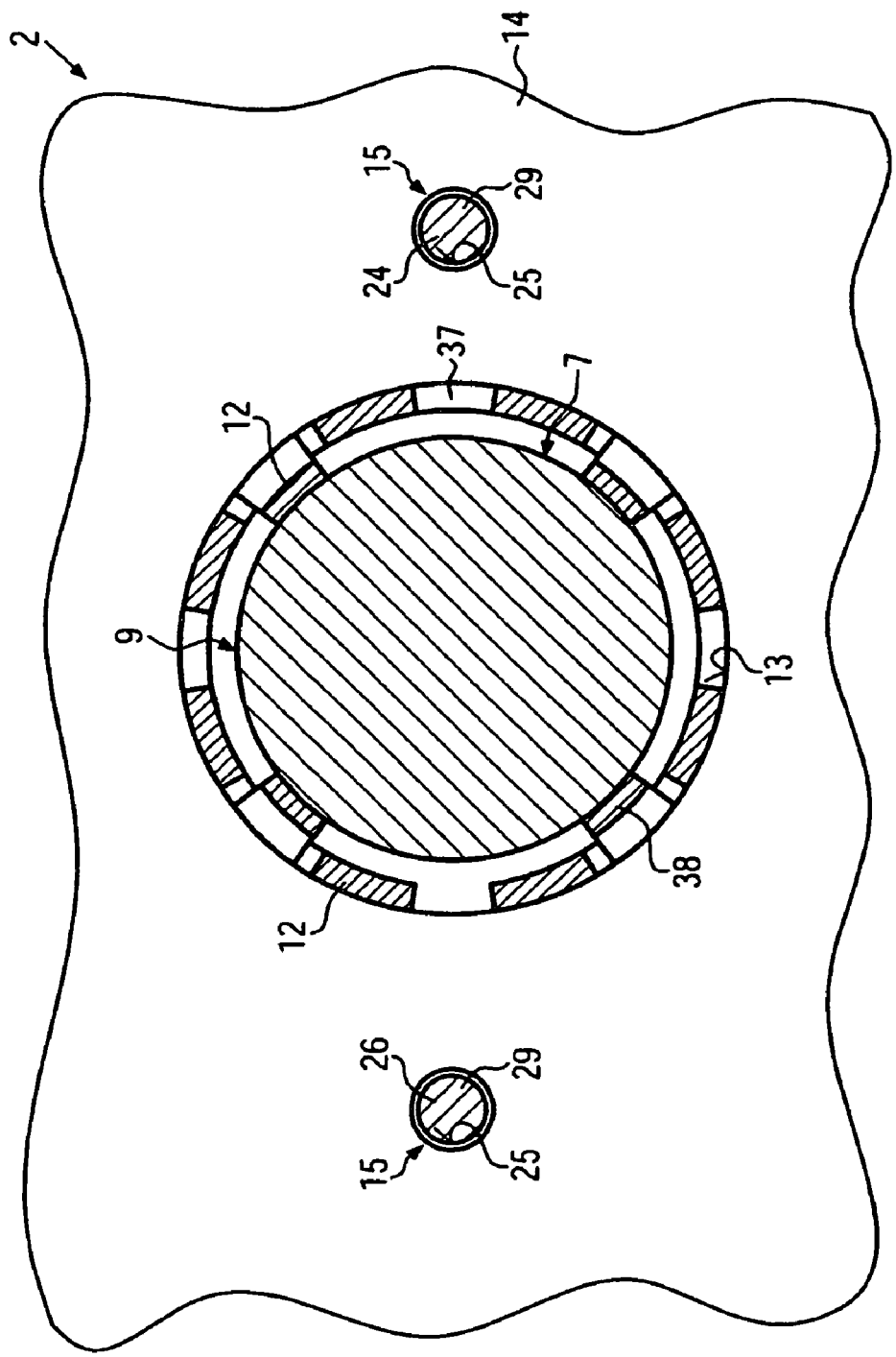
FIG. 12 is a schematic cross section through the apparatus according to FIG. 10, along section line A-A.

FIG. 12 is a schematic cross section through the apparatus according to FIG. 10, along section line A-A. This depiction illustrates that orientation bores 25 and 27 are now disposed on either side of the receiving bore for the sensor head, in order to receive orientation pins 24 and 26 upon insertion of sensor head 9 and to transfer a higher torque.

Figure 13:
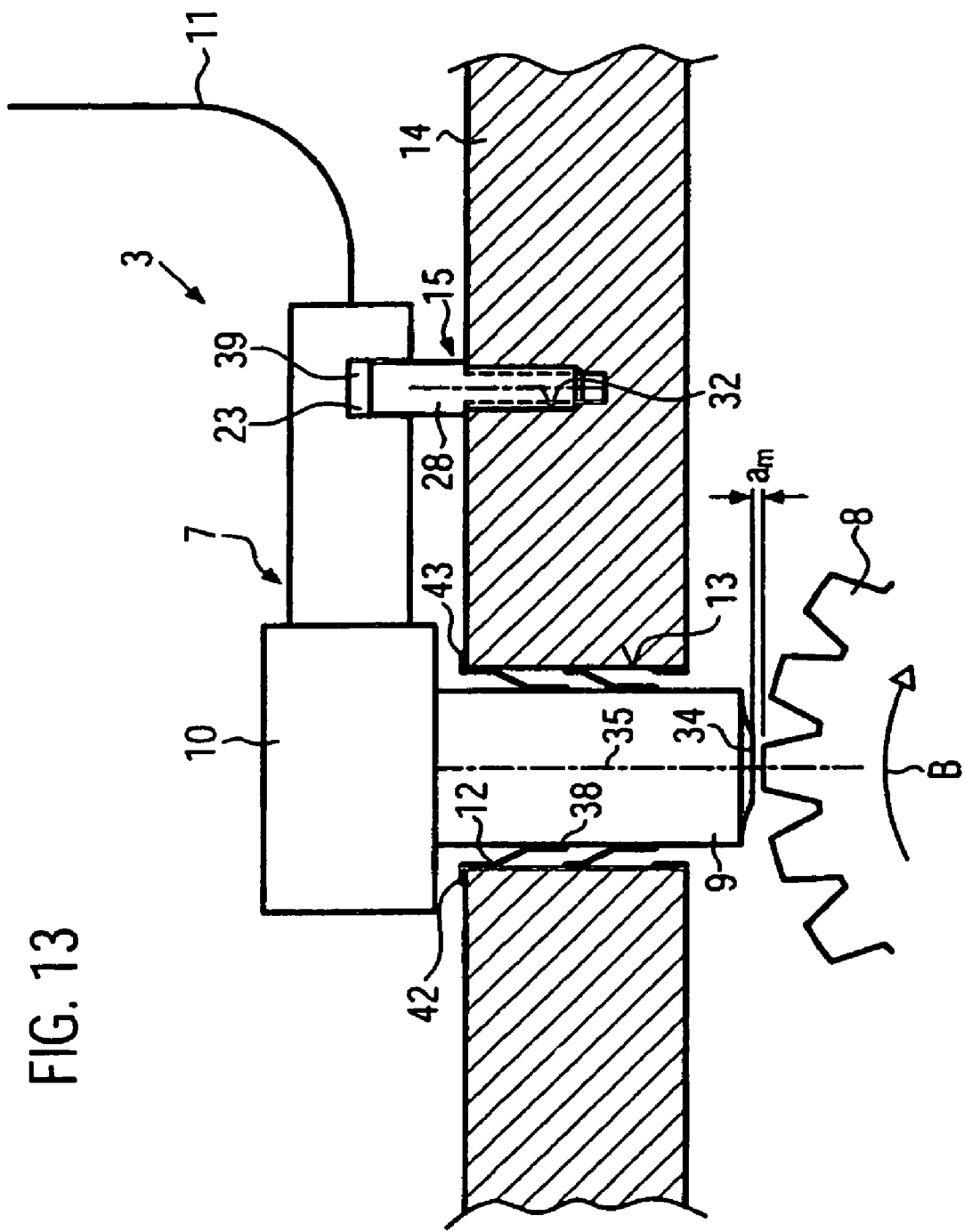
FIG. 13 is a schematic cross section through an apparatus according to a third embodiment of the present invention.

FIG. 13 is a schematic cross section through an apparatus 3 according to a third embodiment of the present invention. This embodiment differs from the preceding embodiments in that a cutout that is in the shape of an orientation bore 39 is introduced into adapter 10. A metal orientation pin 28 is immobilized, as twist prevention system 15, in holder 14. This immobilization can be accomplished by press-fitting a fitting pin, and/or can be ensured by a threaded bore 32 (shown here) or by intermaterial connection. A simple metal orientation pin 28 thus allows elimination of the outlay of bolting an additional complex sensor housing to holder 14 in order to provide, inside the sensor housing, a frictionally engaged axial guidance system for sensor head 9.

Figure 14:
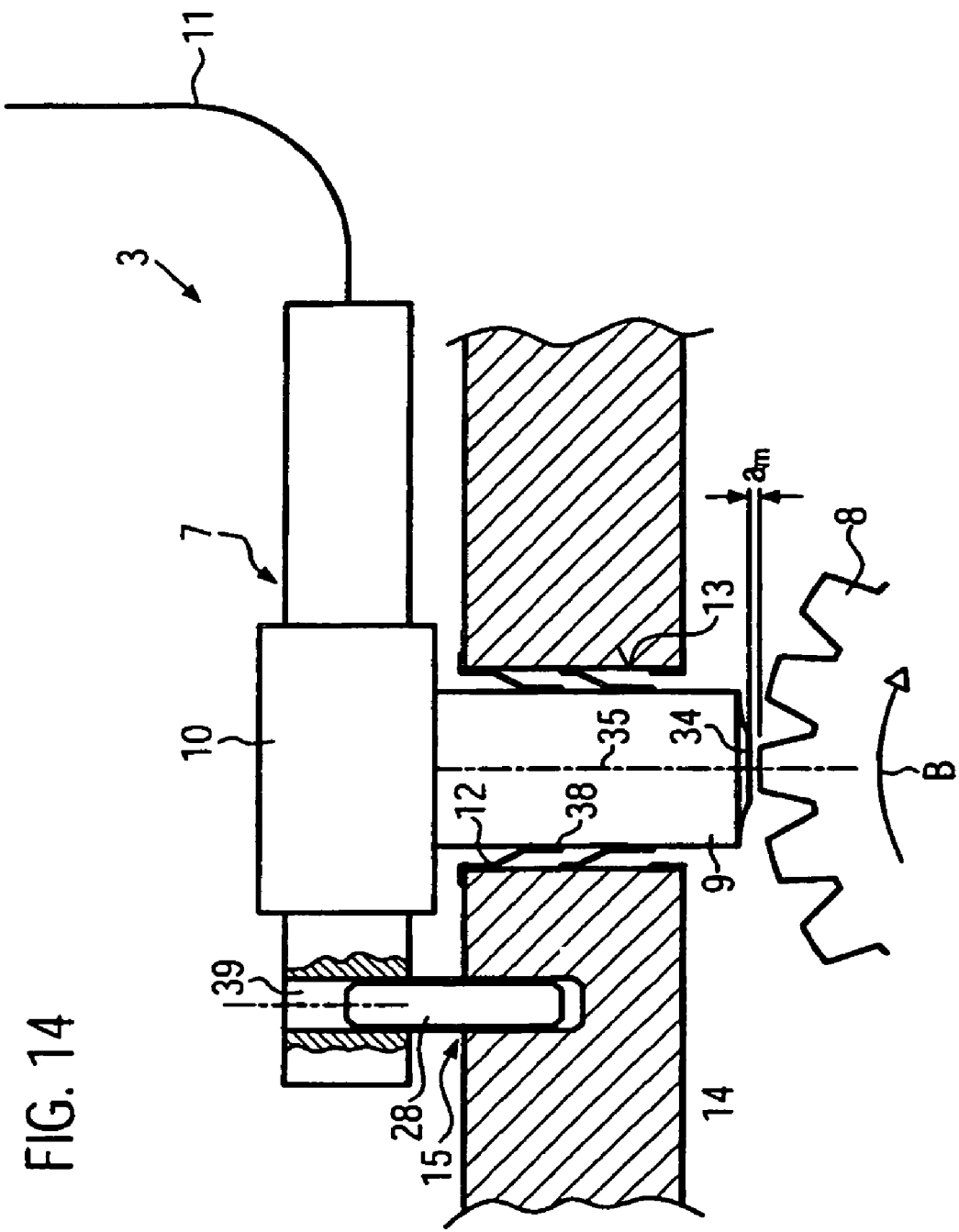
FIG. 14 is a schematic cross section through an apparatus according to a modification of the third embodiment of the present invention.

FIG. 14 is a schematic cross section through an apparatus 3 according to a modification of the third embodiment of the present invention. Whereas in FIG. 13, orientation bore 39 is shaped into the transition region of the adapter to measurement and power supply cable 11, and is therefore embodied only as a blind bore, a through bore can also be implemented as orientation bore 39 in an oppositely located extension 44 of the adapter, as shown here. In addition, orientation pin 28 is pressed as a simple fitting pin into a bore of holder 14, thus eliminating the need to cut a thread.

Figure 15:
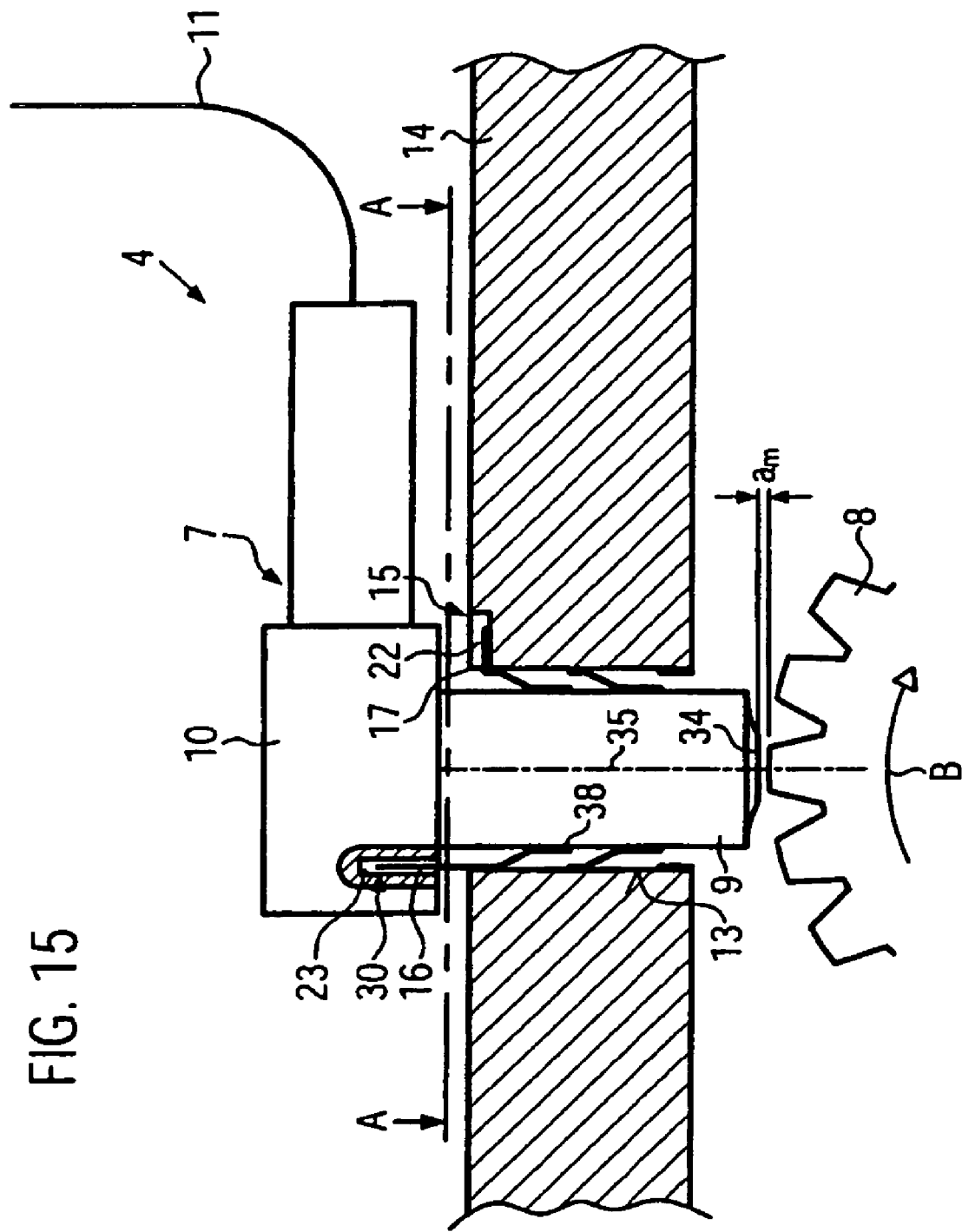
FIG. 15 is a schematic cross section through an apparatus according to a fourth embodiment of the present invention.

FIG. 15 is a schematic cross section through an apparatus 4 according to a fourth embodiment of the present invention. In this embodiment of the present invention, tabs 16 and 17 are provided on one edge of clamping sleeve 12; tab 16 projects into a corresponding cutout 23 of adapter 10 of pulse-type rotation speed transducer 7 and thus forms a further twist prevention system 30, while tab 17 is immobilized in a corresponding cutout 22 of holder 14 and thereby secures a twist prevention system 15 with respect to holder 14.

With this economical reconfiguration of clamping sleeve 12 it is possible on the one hand to ensure that the radial alignment of sensor head 9 with respect to rotor 8 is maintained, and on the other hand to ensure self-adjustment of sensor head 9 to a minimum measurement distance $a_m$ with respect to rotor 8 by way of an axial displaceability of pulse-type rotation speed transducer 7 with respect to rotor 8. For this purpose, cutout 23 is introduced more deeply into the adapter than the portion of tab 16 projecting into cutout 23.

Figure 16:
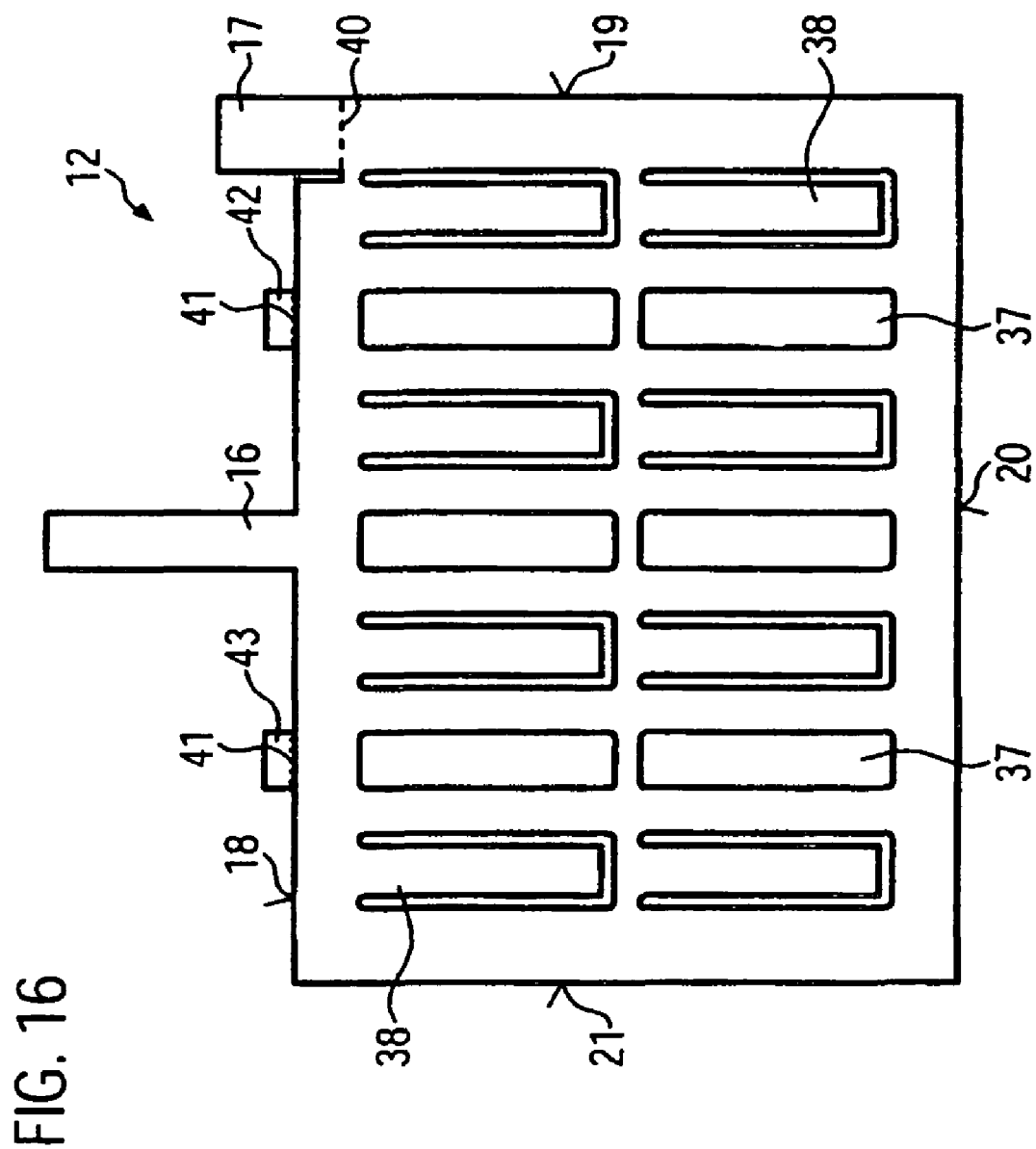
FIG. 16 is a schematic plan view of an unrolled clamping sleeve of the apparatus according to FIG. 15.

FIG. 16 is a schematic plan view of an unrolled clamping sleeve 12 of apparatus 4 according to FIG. 9. This clamping sleeve 12 can, as before, be stamped out of a resilient metal panel, the two tabs 16 and 17 for twist prevention being provided, in addition to the axial securing tabs 43 and 44, on a single edge 18. Tab 17 is simply bent or folded over, in accordance with dotted line 40 shown in FIG. 10, before clamping sleeve 12 is introduced into cutout 22 shown in FIG. 9. This bend is provided below edge 18 in order to immobilize tab 17 radially in a corresponding cutout of the holder.

Figure 17:
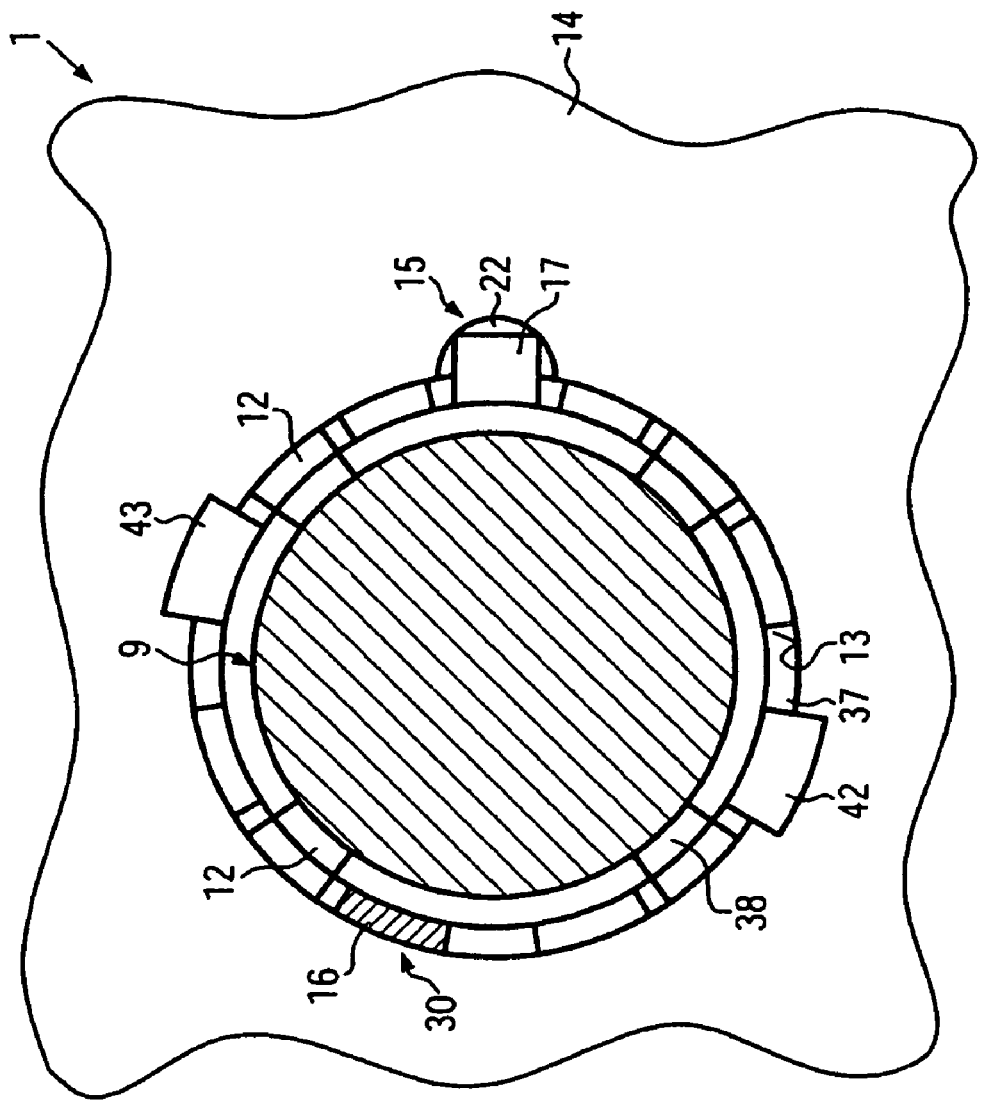
FIG. 17 is a schematic cross section of the apparatus according to FIG. 15, along section line A-A.

FIG. 17 is a schematic cross section of apparatus 4 according to FIG. 15, along section line A-A. This FIG. 17 shows the bent-over tab 17 that projects into a cutout 22 of holder 14 and serves as a twist prevention system 15 with respect to holder 14, while a further tab 16, visible here in cross section, projects into adapter 10 as shown in FIG. 9 and provides a second twist prevention system 30 of clamping sleeve 12 with respect to the adapter. Also visible are the axial securing tabs 42 and 43.

Figure 18:
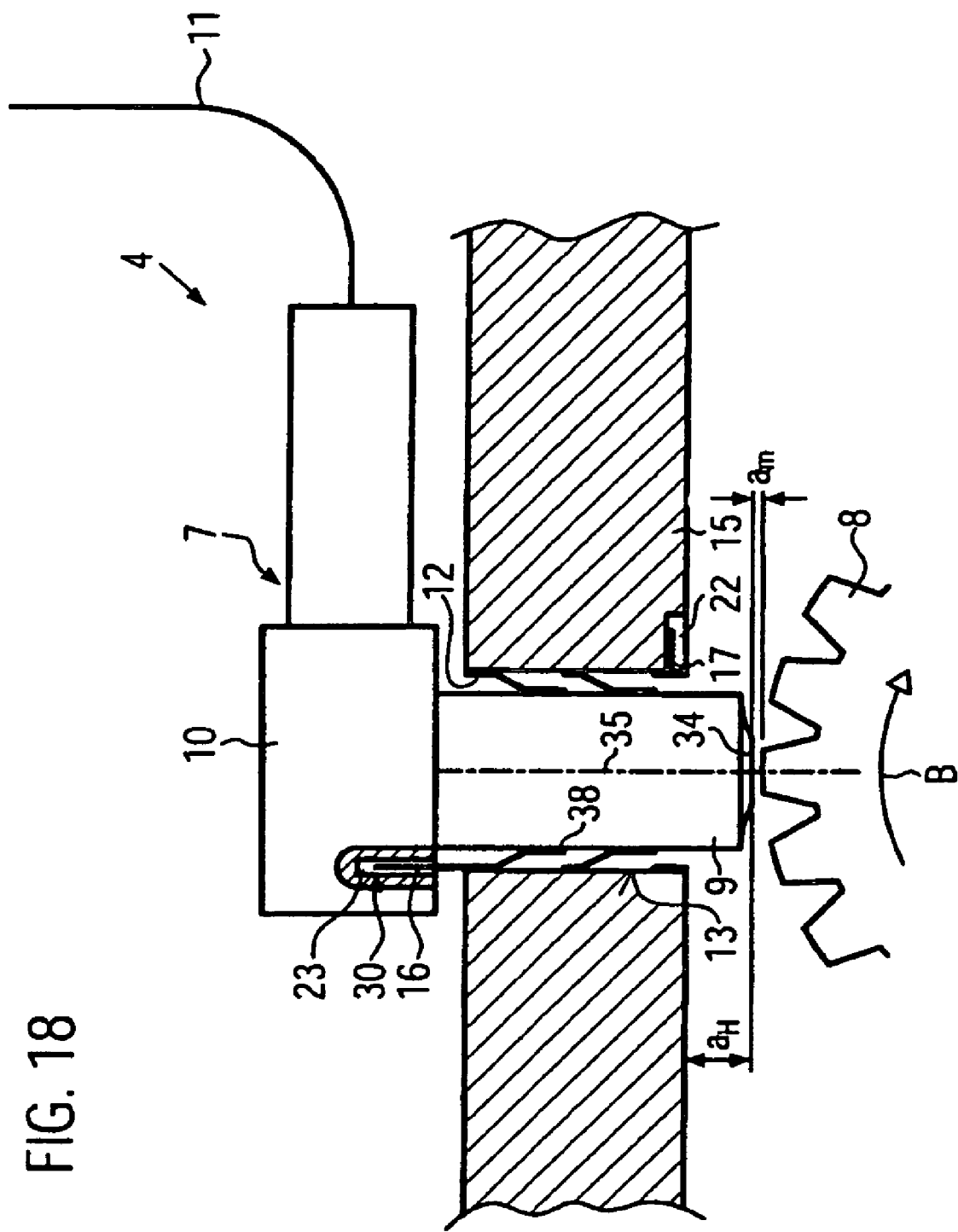
FIG. 18 is a schematic cross section through an apparatus according a modification of the fourth embodiment of the present invention.

FIG. 18 is a schematic cross section through a modified apparatus 4 according to the fourth embodiment of the present invention. The difference in terms of the embodiment of the present invention shown in FIG. 15 is that the two tabs 16 and 17 to prevent twisting of clamping sleeve 12 with respect to holder 14, and of clamping sleeve 12 with respect to adapter 10, are disposed on two oppositely located edges of clamping sleeve 12, as shown in the next Figure.

Figure 19:
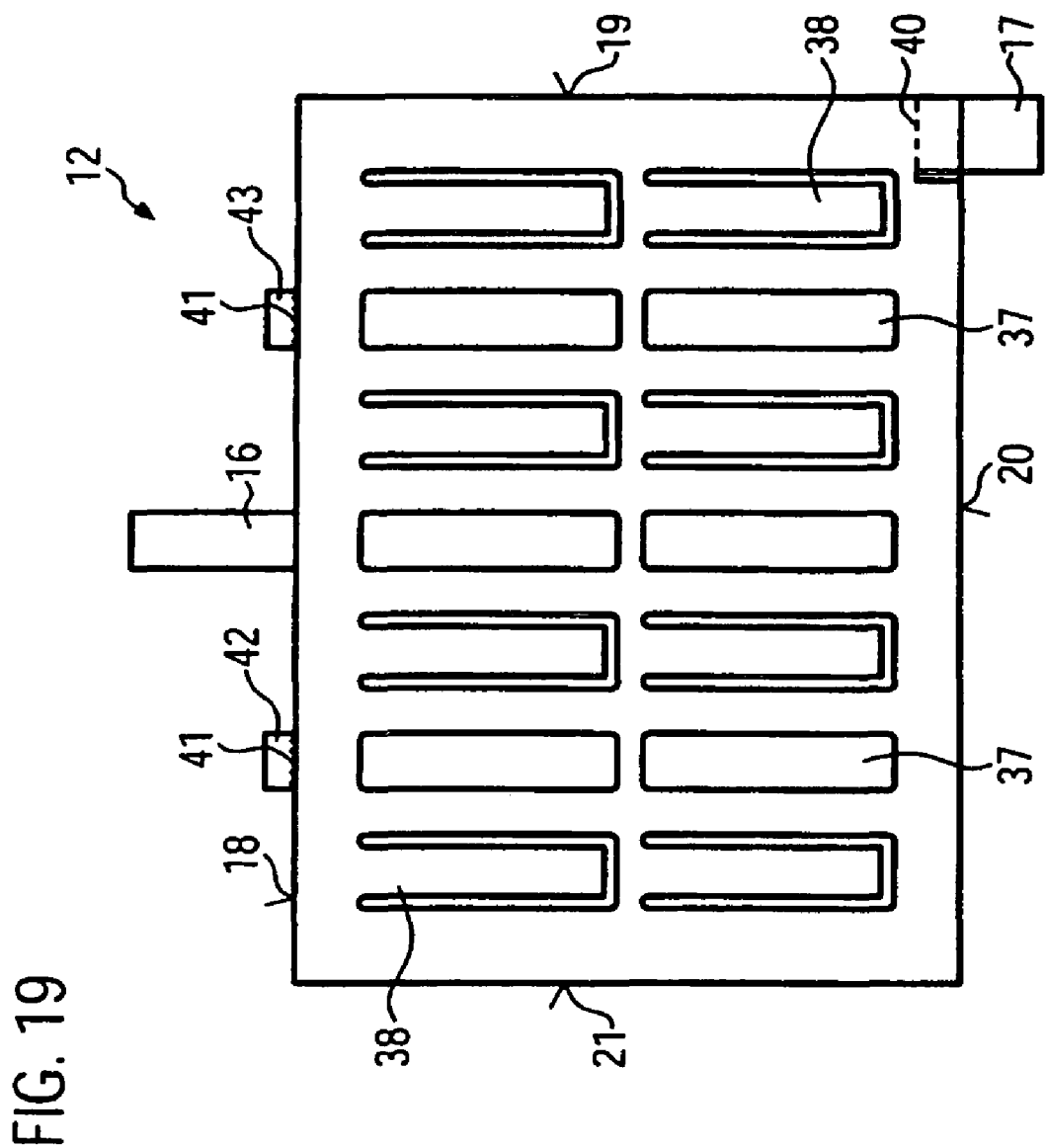
FIG. 19 is a schematic plan view of an unrolled clamping sleeve of the apparatus according to FIG. 18.

FIG. 19 is a schematic plan view of an unrolled clamping sleeve 12 of apparatus 4 according to FIG. 19. Components having the same functions as in FIG. 16 are labeled with the same reference characters and are not additionally discussed. Tab 16, which interacts with a cutout in the adapter, is disposed on edge 18 of clamping sleeve 12, and tab 17, which is folded over along dashed lines 40 prior to introduction into the cutout of the holder is provided in oppositely located fashion on edge 20.

Figure 20:
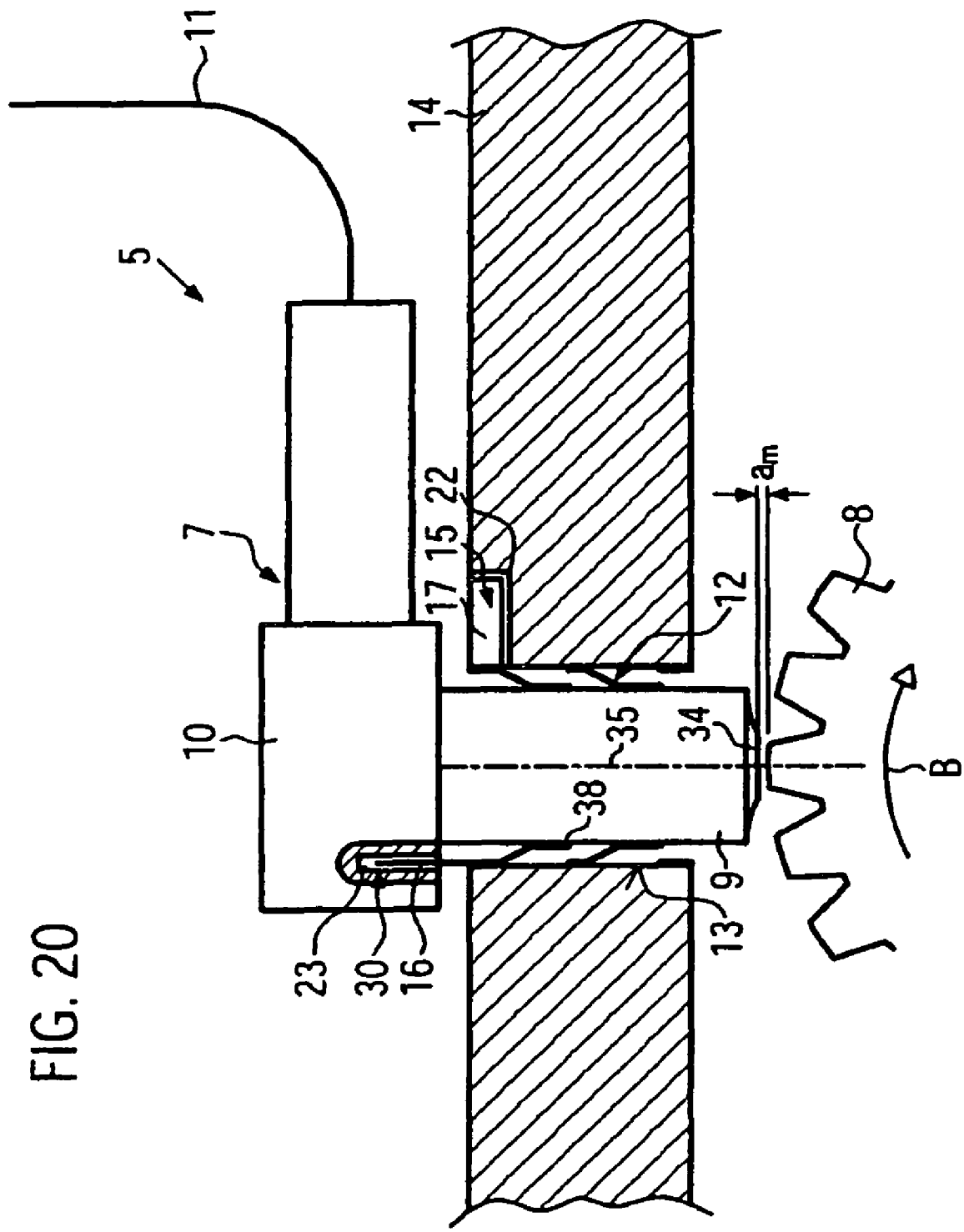
FIG. 20 is a schematic cross section through an apparatus according to a fifth embodiment of the present invention.

FIG. 20 is a schematic cross section through an apparatus 5 according to a fifth embodiment of the present invention. In this embodiment of the present invention, once again tabs 16 and 17 are disposed on clamping sleeve 12; in this embodiment of the present invention the tabs are embodied on two edges of the clamping sleeve that are at an angle to one another. Cutout 22 in holder 14 can correspondingly be implemented by a simple slot, which can be sawn or milled in and extends radially out from bore 13. In this connection, the next Figure shows the unrolled clamping sleeve.

Figure 21:
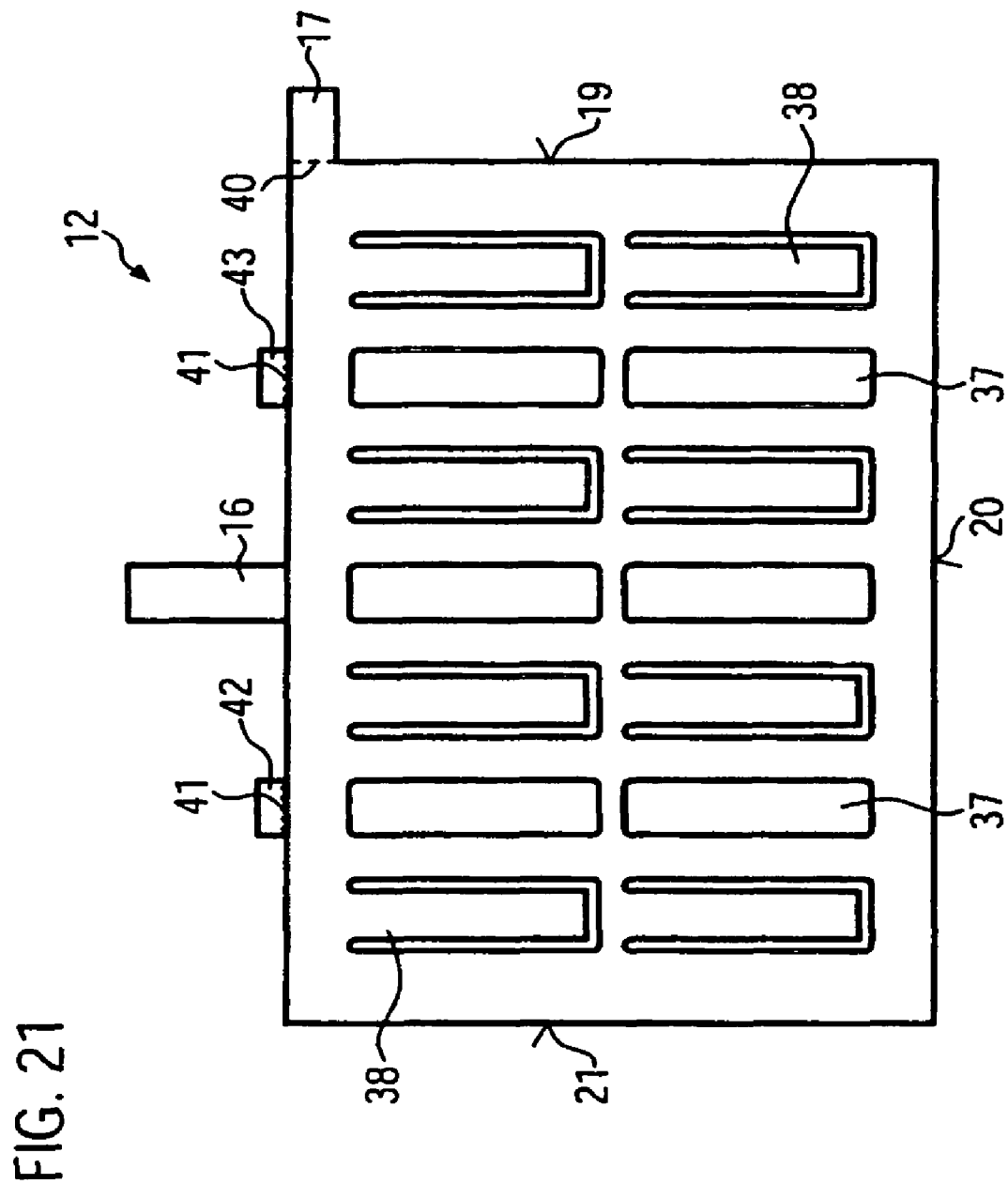
FIG. 21 is a schematic plan view of an unrolled clamping sleeve of the apparatus according to FIG. 20.

FIG. 21 is a schematic plan view of an unrolled clamping sleeve 12 of the apparatus according to FIG. 20. In this case it is necessary to bend tab 17 over along dotted line 40 in order to prepare clamping sleeve 12 for installation into bore 13 shown in FIG. 20. Components having the same functions as in the preceding FIGS. 16 and 19 are labeled with identical reference characters and are not additionally discussed.

Figure 22:
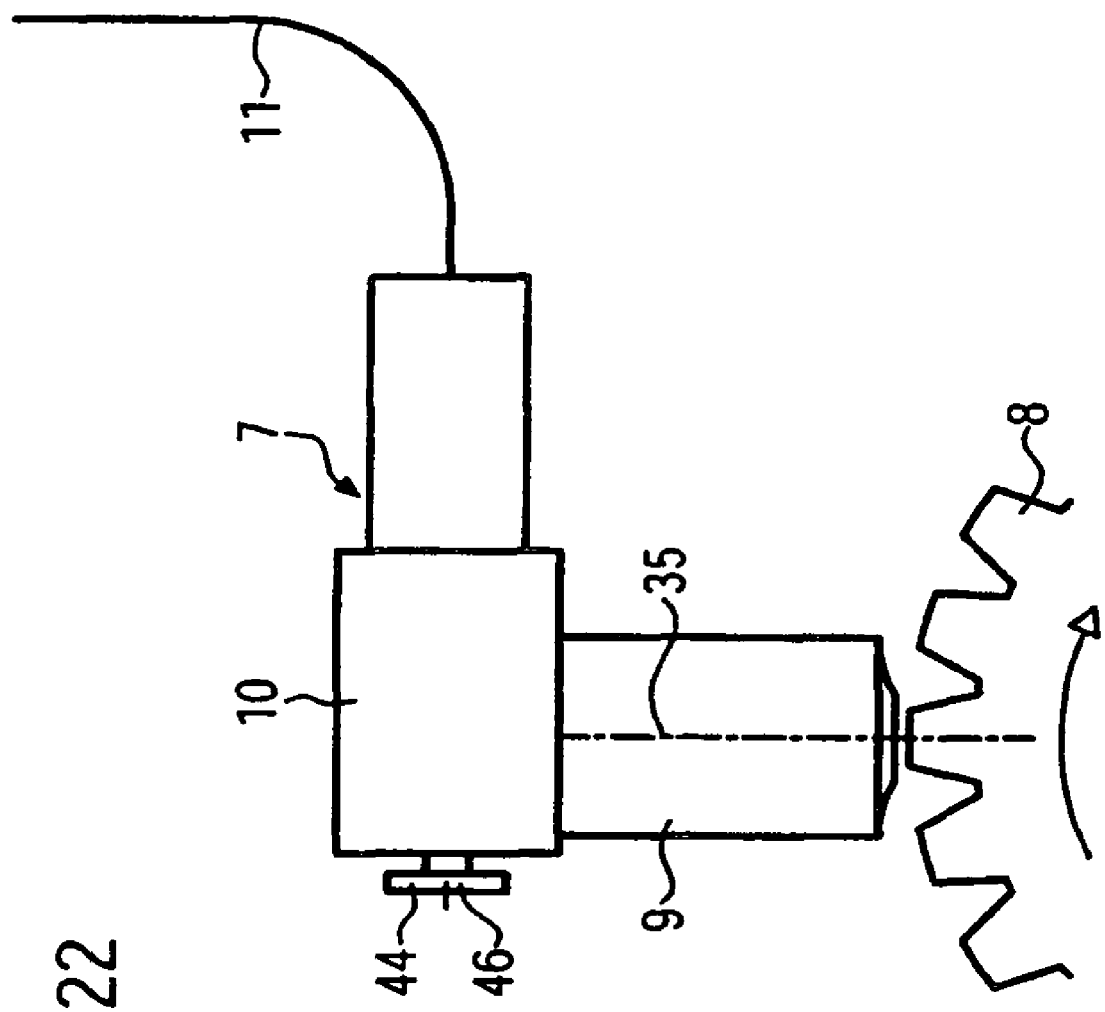
FIG. 22 is a schematic view of a further active pulse-type rotation speed transducer having a modified adapter for a sixth embodiment of the present invention.

FIG. 22 is a schematic view of a further active pulse-type rotation speed transducer 7 having a modified adapter 10 for a sixth embodiment of the present invention. In this embodiment of the present invention, a holding pin 46 is shaped onto adapter 10 at a location opposite the measurement and power supply cable. A fork-shaped tab, as shown in the next Figure, can be brought into engagement with this holding pin 46 in order to form a first twist prevention system between the adapter and clamping sleeve.

Figure 23:
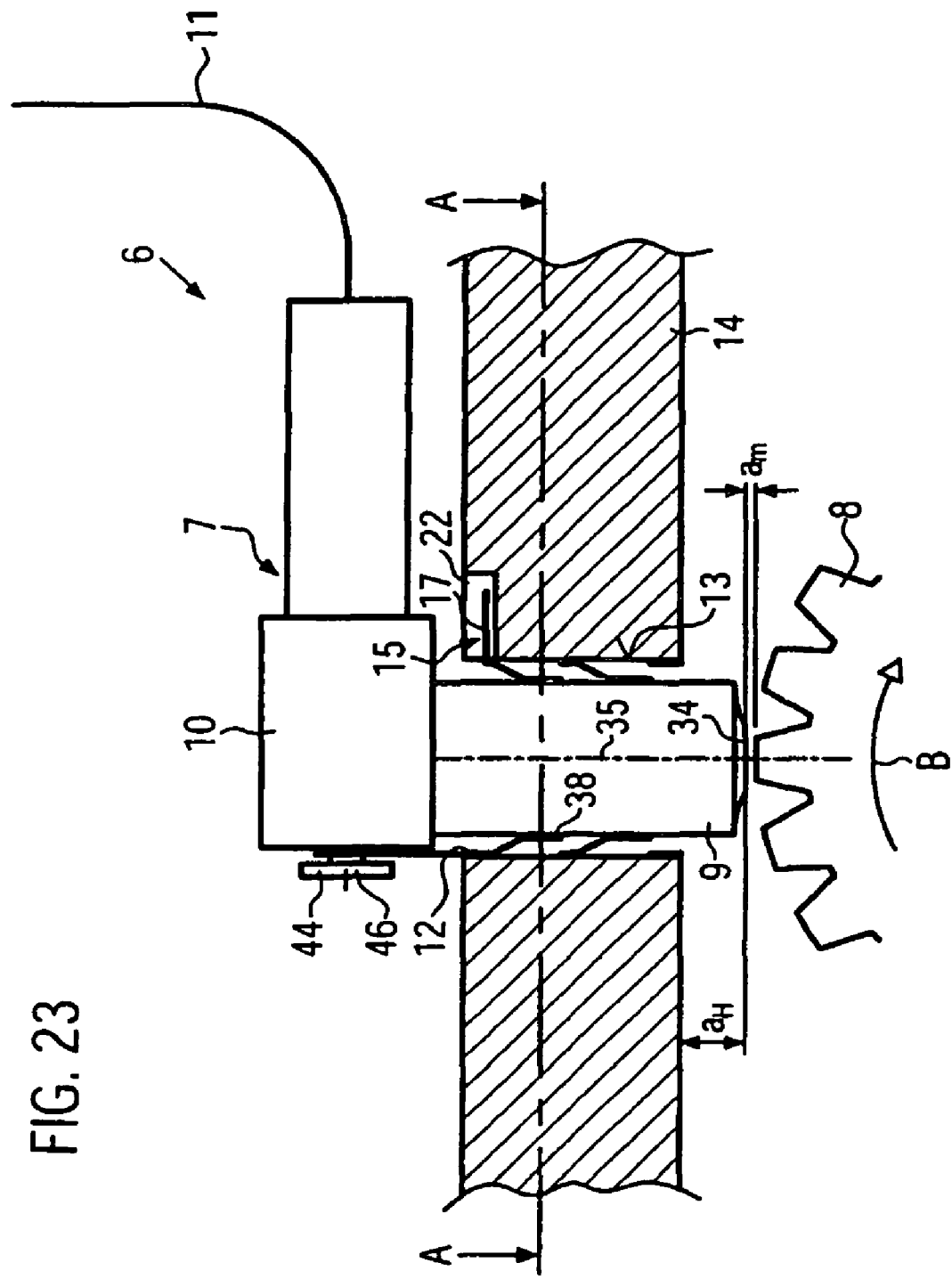
FIG. 23 is a schematic cross section through an apparatus according to a sixth embodiment of the present invention.

FIG. 23 is a schematic cross section through an apparatus 6 according to a sixth embodiment of the present invention. Upon introduction of the clamping sleeve into bore 13 of holder 14, firstly a bent-over tab 17 of clamping sleeve 12 is introduced, as a twist prevention system 15 between clamping sleeve 12 and holder 14, into a cutout 22 of holder 14. Upon subsequent introduction of sensor head 9 into clamping sleeve 12 and the holder of sensor head 9, the twist prevention between sensor head 9 and holder 14 is also completed by the fact that the fork-shaped tab 45 is brought into engagement with holder pin 46 of adapter 10.

Figure 24:
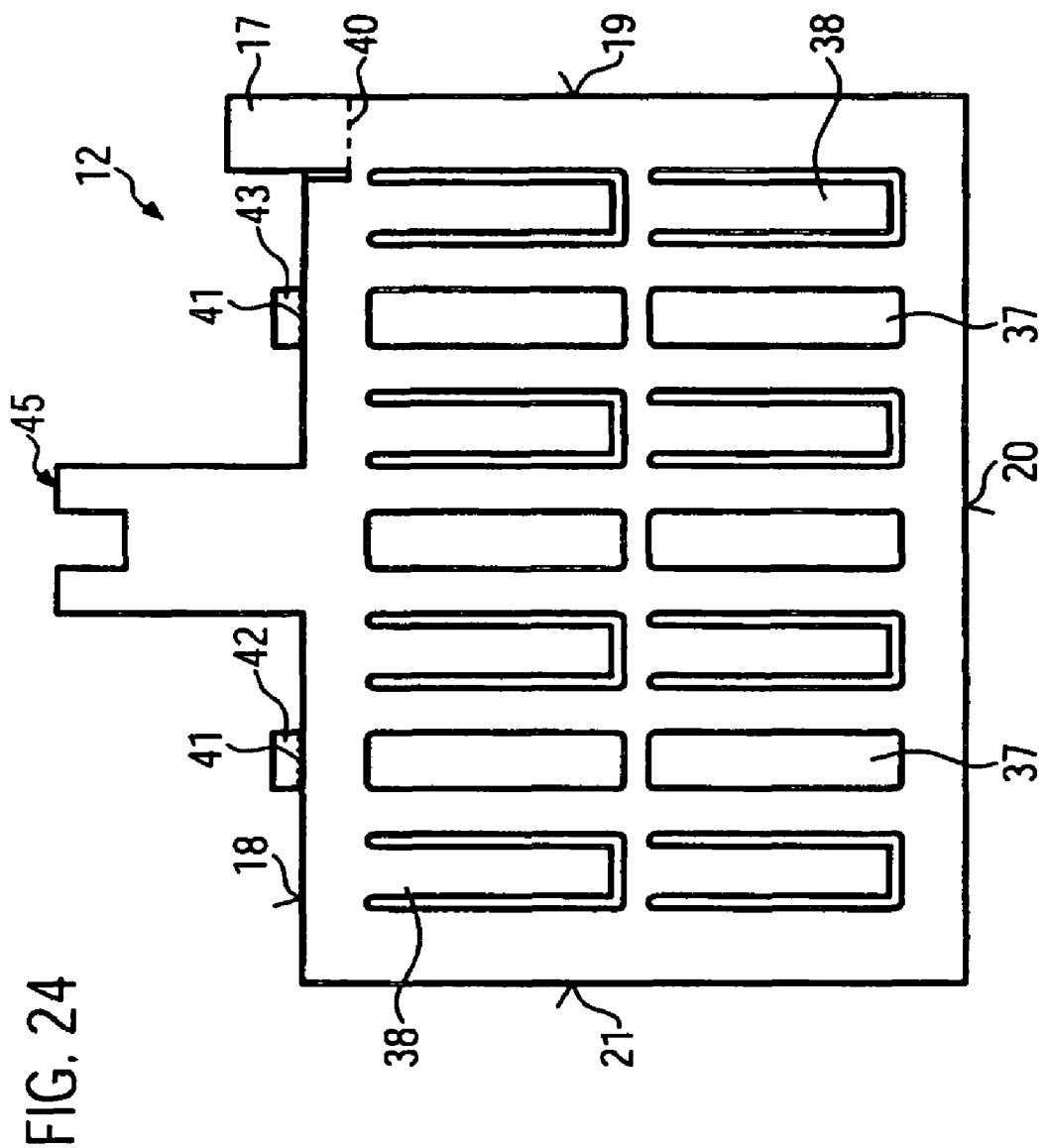
FIG. 24 is a schematic plan view of an unrolled clamping sleeve of the apparatus according to FIG. 23.

FIG. 24 is a schematic plan view of an unrolled clamping sleeve of the apparatus according to FIG. 23 having the additional tabs 45 and 17 according to the present invention, tab 17 being at first not yet bent over.

The "LIST OF REFERENCE CHARACTERS" is as follows:

1 First embodiment of the apparatus, in two modifications
2 Second embodiment of the apparatus, in two modifications
3 Third embodiment of the apparatus, in two modifications
4 Fourth embodiment of the apparatus, in two modifications
5 Fifth embodiment of the apparatus
6 Sixth embodiment of the apparatus
7 Active pulse-type rotation speed transducer
8 Rotor
9 Sensor head
10 Adapter
11 Measurement and power supply cable
12 Elastic clamping sleeve
13 Bore
14 Holder
15 Twist prevention system (with respect to holder)
16 First tab (with respect to adapter)
17 Second tab (with respect to holder)
18 Edge of clamping sleeve
19 Edge of clamping sleeve
20 Edge of clamping sleeve
21 Edge of clamping sleeve
22 Cutout in holder
23 Cutout in adapter
24 First orientation pin (of adapter)
25 Orientation bore (of holder)
26 Second orientation pin (of adapter)
27 Orientation bore (of holder)
28 Orientation pin (of holder)
29 Cross-sectional area (of pin)
30 Second twist prevention system (with respect to adapter)
31 Coupling element
32 Threaded bore
33 Coupling element
34 Measurement tip
35 Axis of sensor head
36 Axis of orientation pin
37 Cutout
38 Elastic clamping tab
39 Orientation bore (of adapter)

40 Dotted line
40 Dotted line
42 Axial securing tab
43 Axial securing tab
44 Extension of adapter
45 Fork-shaped tab
46 Holding pin
$a_H$ Distance between holder and rotor
$a_m$ Measurement distance

What is claimed is:

1. An apparatus for self-adjustment of a pulse-type rotation speed transducer in relation to a rotor, comprising:
a pulse-type rotation speed transducer having a cylindrical sensor head and an adapter to a measurement and power supply cable;
an elastic clamping sleeve that radially encompasses the cylindrical sensor head and is braced in frictionally engaged fashion in a bore of a holder, wherein the clamping sleeve forms a press fit for the sensor head in the bore, and wherein the press fit enables a rotation and an axial displacement between the holder and sensor head;
wherein the pulse-type rotation speed transducer has an active, orientation-dependent, cylindrical sensor head, wherein one of the clamping sleeve and the pulse-type rotation speed transducer has a twist prevention system in relation to the holder, and wherein the twist prevention system enables an axial displacement of the sensor head in the clamping sleeve with respect to the rotor, for self-adjustment, while maintaining the radial alignment or orientation of the sensor head with respect to the rotor.

2. The apparatus of claim 1, wherein the clamping sleeve has two tabs as a twist prevention system, a first tab being in engagement with the adapter of the pulse-type rotation speed transducer, and a second tab with the holder.

3. The apparatus of claim 2, wherein the first tab and the second tab of the clamping sleeve are disposed on a single edge of the clamping sleeve.

4. The apparatus of claim 3, wherein the first tab and the second tab of the clamping sleeve are disposed on edges that are located opposite one another.

5. The apparatus of claim 2, wherein the first tab and the second tab of the clamping sleeve are disposed on edges of the clamping sleeve that are at an angle to one another.

6. The apparatus of claim 2, wherein the second tab of the clamping sleeve is immobilized in a matching cutout of the holder, and the first tab of the clamping sleeve projects into a matching cutout of the adapter.

7. The apparatus of claim 6, wherein the first tab of the clamping sleeve projects into the cutout of the adapter, and the adapter, along with the cutout, is axially displaceable with respect to the first tab.

8. The apparatus of claim 2, wherein the adapter has a plurality of orientation pins that withstand a maximally occurring torque.

9. The apparatus of claim 1, wherein the clamping sleeve has smooth edges without tabs, and the adapter has at least one orientation pin that can be brought into engagement with an orientation bore of the holder to radially immobilize the pulse-type rotation speed transducer in an orientation direction.

10. The apparatus of claim 9, wherein a cross-sectional area and a cross-sectional shape of the orientation pin have an area moment of inertia which is greater than the torque occurring between the holder and the adapter.

11. The apparatus of claim 1, wherein the clamping sleeve has almost smooth edges without additional tabs, and the adapter has at least one orientation bore that can be brought into engagement with an orientation pin of the holder to radially immobilize the pulse-type rotation speed transducer in an orientation direction.

12. The apparatus of claim 11, wherein a cross-sectional area and a cross-sectional shape of the orientation pin have an area moment of inertia which is greater than the torque occurring between the holder and the adapter.

13. A method for disposing a pulse-type rotation speed transducer on a rotor, the method comprising:
manufacturing a pulse-type rotation speed transducer having an active, orientation-dependent, cylindrical sensor head and having an adapter to a measurement and power supply cable;
introducing a clamping sleeve into a bore of a holder, accompanied by attachment of a first twist prevention system for the clamping sleeve with respect to the holder;
introducing the cylindrical sensor head into the clamping sleeve, accompanied by attachment of a second twist prevention system for the clamping sleeve with respect to the pulse-type rotation speed transducer, while maintaining an axially movable press fit of the cylindrical sensor head in the clamping sleeve in the direction toward the rotor;
axially displacing the sensor head in the clamping sleeve until the sensor head touches the stationary rotor; and
self-adjusting the sensor head to a minimum measuring distance from the rotor by rotating the rotor accompanied by axial adapting displacement of the press fit of the sensor head in the clamping sleeve.

14. A method for disposing a pulse-type rotation speed transducer on a rotor, the method comprising:
manufacturing a pulse-type rotation speed transducer having an active, orientation-dependent, cylindrical sensor head and having an adapter to a measurement and power supply cable, a twist prevention system being shaped onto or into the adapter;
introducing a clamping sleeve into a bore of a holder for a rotatable and axially displaceable press fit between the bore and the sensor head;
engaging the clamping sleeve, accompanied by coupling of the twist prevention system with a coupling element of the holder, while maintaining an axially movable press fit of the cylindrical sensor head in the clamping sleeve in the direction toward the rotor;
axially displacing the sensor head in the clamping sleeve until the sensor head touches the stationary rotor;
self-adjusting the sensor head to a minimum measuring distance from the rotor by rotating the rotor accompanied by axial adapting displacement of the press fit of the sensor head in the clamping sleeve.

15. The method of claim 14, wherein an orientation pin is attached, onto one of the adapter and the holder, parallel to the axis of the bore in the holder, and correspondingly introducing an orientation bore into one of the holder and the adapter, respectively.

* * * * *